United States Patent
Grayson

(10) Patent No.: US 9,414,310 B2
(45) Date of Patent: Aug. 9, 2016

(54) SYSTEM AND METHOD FOR SMALL CELL POWER CONTROL IN AN ENTERPRISE NETWORK ENVIRONMENT

(71) Applicant: CISCO TECHNOLOGY, INC., San Jose, CA (US)

(72) Inventor: Mark Grayson, Maidenhead (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 151 days.

(21) Appl. No.: 14/092,448

(22) Filed: Nov. 27, 2013

(65) Prior Publication Data

US 2015/0146594 A1    May 28, 2015

(51) Int. Cl.
H04W 52/02    (2009.01)

(52) U.S. Cl.
CPC ................ *H04W 52/0206* (2013.01)

(58) Field of Classification Search
None
See application file for complete search history.

(56) References Cited

U.S. PATENT DOCUMENTS

| | | | |
|---|---|---|---|
| 6,141,565 A | 10/2000 | Feuerstein et al. |
| 6,483,820 B1 | 11/2002 | Davidson et al. |
| 7,151,937 B2 | 12/2006 | Jin et al. |
| 7,379,739 B2 | 5/2008 | Rajkotia et al. |
| 7,884,763 B2 | 2/2011 | Na et al. |
| 7,983,667 B2 | 7/2011 | Hart et al. |
| 8,045,996 B2 | 10/2011 | Brunner et al. |
| 8,107,950 B2 | 1/2012 | Amerijoo et al. |
| 8,170,544 B1 | 5/2012 | Satapathy et al. |
| 8,229,451 B2 | 7/2012 | Frenger et al. |
| 8,275,376 B2 | 9/2012 | Vikberg |
| 8,320,965 B2 | 11/2012 | Kwun |
| 8,340,703 B2 | 12/2012 | Laroia et al. |
| 8,340,711 B1 | 12/2012 | Glass et al. |
| 8,400,921 B2 | 3/2013 | Grayson et al. |
| 8,437,810 B2 | 5/2013 | Hussain |
| 8,538,337 B2 | 9/2013 | Damnjanovic |
| 8,588,698 B2 | 11/2013 | Brisebois |

(Continued)

FOREIGN PATENT DOCUMENTS

| | | |
|---|---|---|
| CN | 102378288 | 3/2012 |
| CN | 104684052 A | 6/2015 |

(Continued)

OTHER PUBLICATIONS

U.S. Appl. No. 14/679,868, filed Apr. 6, 2015, entitled "System and Method for Managing Interference in a Network Environment Based on User Presence," Inventors: Mark Grayson, et al.

(Continued)

*Primary Examiner* — Benjamin H Elliott, IV
(74) *Attorney, Agent, or Firm* — Patent Capital Group

(57) ABSTRACT

A method is provided in one embodiment and includes receiving a first message including an indication that a first access point of a first network is a gateway access point of a first network, receiving a second message including an indication that a second access point of the first network is an inner access point of the first network, and receiving an indication of a number of wireless devices registered with at least one of the first access point and the second access point. The method further includes determining a power mode for the second access point based upon whether at least one wireless device is registered with the first access point or the second access point, and sending a power mode command message to the second access point indicative of the determined power mode.

20 Claims, 10 Drawing Sheets

(56) References Cited

U.S. PATENT DOCUMENTS

| | | |
|---|---|---|
| 8,611,299 B2 | 12/2013 | Yang et al. |
| 8,619,563 B2 | 12/2013 | Madan et al. |
| 8,639,243 B2 | 1/2014 | Radulescu et al. |
| 8,687,585 B2 | 4/2014 | Marks et al. |
| 8,694,044 B2 | 4/2014 | Hiltunen et al. |
| 8,712,459 B2 | 4/2014 | Lim et al. |
| 8,743,772 B2 | 6/2014 | Garavaglia et al. |
| 8,755,791 B2 | 6/2014 | Bontu et al. |
| 8,761,826 B2 | 6/2014 | Brown et al. |
| 8,792,886 B2 | 7/2014 | Meshkati |
| 8,797,983 B2 | 8/2014 | Sun |
| 8,811,905 B1 | 8/2014 | Hui et al. |
| 8,830,936 B2 | 9/2014 | Ren |
| 8,838,125 B2 | 9/2014 | Dalsgaard et al. |
| 8,854,998 B2 | 10/2014 | Johansson et al. |
| 8,862,134 B1 | 10/2014 | Zhou |
| 8,874,126 B2 | 10/2014 | Jeong et al. |
| 8,983,470 B1 | 3/2015 | Ryan |
| 9,014,004 B2 | 4/2015 | Nuss et al. |
| 9,031,591 B2 | 5/2015 | Ma et al. |
| 9,131,462 B1 | 9/2015 | Verghese |
| 9,143,995 B2 | 9/2015 | Okmyanskiy et al. |
| 9,148,838 B2 | 9/2015 | Yanover et al. |
| 9,167,444 B2 | 10/2015 | Nuss et al. |
| 9,219,816 B2 | 12/2015 | Grayson et al. |
| 9,226,255 B2 | 12/2015 | Grayson et al. |
| 2004/0085909 A1 | 5/2004 | Soliman |
| 2005/0036462 A1 | 2/2005 | Sillasto et al. |
| 2005/0064820 A1 | 3/2005 | Park et al. |
| 2005/0215251 A1 | 9/2005 | Krishnan |
| 2005/0282572 A1 | 12/2005 | Wigard et al. |
| 2006/0068712 A1 | 3/2006 | Kroboth et al. |
| 2006/0229087 A1 | 10/2006 | Davis et al. |
| 2007/0008885 A1 | 1/2007 | Bonner |
| 2008/0107074 A1 | 5/2008 | Salmenkaita et al. |
| 2008/0139197 A1 | 6/2008 | Misra et al. |
| 2008/0188265 A1 | 8/2008 | Carter et al. |
| 2008/0268833 A1 | 10/2008 | Huang |
| 2009/0054047 A1 | 2/2009 | Kylvaja |
| 2009/0092088 A1 | 4/2009 | Kokku |
| 2009/0129284 A1 | 5/2009 | Jung et al. |
| 2009/0129291 A1 | 5/2009 | Gupta |
| 2009/0232074 A1 | 9/2009 | Yang et al. |
| 2009/0323530 A1 | 12/2009 | Trigui et al. |
| 2010/0029282 A1 | 2/2010 | Stamoulis et al. |
| 2010/0034157 A1 | 2/2010 | Stolyar et al. |
| 2010/0056184 A1 | 3/2010 | Vakil |
| 2010/0093358 A1 | 4/2010 | Cheong et al. |
| 2010/0099424 A1 | 4/2010 | Centonza |
| 2010/0112982 A1 | 5/2010 | Singh et al. |
| 2010/0177722 A1 | 7/2010 | Guvenc |
| 2010/0203891 A1 | 8/2010 | Nagaraja |
| 2010/0227611 A1 | 9/2010 | Schmidt et al. |
| 2010/0240314 A1 | 9/2010 | Chang |
| 2010/0260036 A1 | 10/2010 | Molnar et al. |
| 2010/0260068 A1 | 10/2010 | Bhatt et al. |
| 2010/0267408 A1 | 10/2010 | Lee et al. |
| 2010/0275083 A1 | 10/2010 | Nam et al. |
| 2010/0279628 A1 | 11/2010 | Love et al. |
| 2010/0311449 A1 | 12/2010 | Whinnett |
| 2011/0039539 A1 | 2/2011 | Maida et al. |
| 2011/0039570 A1 | 2/2011 | Maida et al. |
| 2011/0077016 A1 | 3/2011 | Stolyar et al. |
| 2011/0086614 A1 | 4/2011 | Brisebois |
| 2011/0110316 A1 | 5/2011 | Chen et al. |
| 2011/0128862 A1 | 6/2011 | Kallin |
| 2011/0136478 A1 | 6/2011 | Trigui |
| 2011/0151877 A1 | 6/2011 | Tafreshi |
| 2011/0176497 A1 | 7/2011 | Gopalakrishnan |
| 2011/0182375 A1 | 7/2011 | Kim et al. |
| 2011/0201277 A1 | 8/2011 | Eguchi |
| 2011/0211514 A1 | 9/2011 | Hamalainin |
| 2011/0223964 A1 | 9/2011 | Ebiko |
| 2011/0250881 A1 | 10/2011 | Michel et al. |
| 2011/0287755 A1* | 11/2011 | Cho ................. H04W 52/0225 455/418 |
| 2012/0004003 A1 | 1/2012 | Shaheen et al. |
| 2012/0015655 A1 | 1/2012 | Lee |
| 2012/0015657 A1 | 1/2012 | Comsa et al. |
| 2012/0028584 A1 | 2/2012 | Zhang et al. |
| 2012/0046026 A1* | 2/2012 | Chande ................. H04W 24/10 455/422.1 |
| 2012/0046063 A1* | 2/2012 | Chande ............... H04W 52/143 455/522 |
| 2012/0083201 A1 | 4/2012 | Truong |
| 2012/0087247 A1 | 4/2012 | Min et al. |
| 2012/0100849 A1 | 4/2012 | Marisco |
| 2012/0100851 A1 | 4/2012 | Zheng |
| 2012/0129537 A1 | 5/2012 | Liu et al. |
| 2012/0178451 A1 | 7/2012 | Kubota |
| 2012/0231797 A1 | 9/2012 | Van Phan et al. |
| 2012/0238263 A1 | 9/2012 | Caretti et al. |
| 2012/0252457 A1 | 10/2012 | Shindo |
| 2012/0258720 A1 | 10/2012 | Tinnakornsurisphap et al. |
| 2012/0265888 A1 | 10/2012 | Roeland et al. |
| 2012/0282964 A1 | 11/2012 | Xiao et al. |
| 2012/0327850 A1 | 12/2012 | Wang et al. |
| 2013/0003697 A1 | 1/2013 | Adjakple et al. |
| 2013/0005388 A1* | 1/2013 | Naka ................. H04W 52/244 455/522 |
| 2013/0021962 A1 | 1/2013 | Hu et al. |
| 2013/0077482 A1 | 3/2013 | Krishna et al. |
| 2013/0079007 A1 | 3/2013 | Nagaraja et al. |
| 2013/0102313 A1 | 4/2013 | Tinnakornsrisuphap et al. |
| 2013/0107798 A1 | 5/2013 | Gao et al. |
| 2013/0121257 A1 | 5/2013 | He et al. |
| 2013/0136072 A1 | 5/2013 | Bachmann et al. |
| 2013/0137447 A1 | 5/2013 | Zhang et al. |
| 2013/0142116 A1 | 6/2013 | Prakash |
| 2013/0163543 A1 | 6/2013 | Freda et al. |
| 2013/0182680 A1 | 7/2013 | Choi et al. |
| 2013/0210431 A1* | 8/2013 | Abe ................. H04W 52/244 455/435.1 |
| 2013/0229945 A1 | 9/2013 | Cha et al. |
| 2013/0242748 A1 | 9/2013 | Mangalvedhe et al. |
| 2013/0250875 A1 | 9/2013 | Chen et al. |
| 2013/0294356 A1 | 11/2013 | Bala et al. |
| 2013/0308531 A1 | 11/2013 | So et al. |
| 2013/0310103 A1 | 11/2013 | Madan et al. |
| 2013/0326001 A1 | 12/2013 | Jorgensen et al. |
| 2013/0331079 A1 | 12/2013 | Racz et al. |
| 2013/0337821 A1 | 12/2013 | Clegg |
| 2013/0339783 A1 | 12/2013 | Alonso et al. |
| 2013/0343288 A1 | 12/2013 | Ratasuk et al. |
| 2013/0343304 A1 | 12/2013 | Kaippallimalil et al. |
| 2013/0343755 A1 | 12/2013 | Cvijetic et al. |
| 2014/0003225 A1 | 1/2014 | Mann et al. |
| 2014/0010086 A1 | 1/2014 | Etemad et al. |
| 2014/0011505 A1 | 1/2014 | Liao |
| 2014/0018073 A1 | 1/2014 | Frenger |
| 2014/0029524 A1 | 1/2014 | Dimou et al. |
| 2014/0056220 A1 | 2/2014 | Poitau et al. |
| 2014/0056278 A1 | 2/2014 | Marinier et al. |
| 2014/0073304 A1 | 3/2014 | Brisebois |
| 2014/0078986 A1 | 3/2014 | Kaippallimalil et al. |
| 2014/0086226 A1 | 3/2014 | Zhao et al. |
| 2014/0092765 A1 | 4/2014 | Agarwal et al. |
| 2014/0112251 A1 | 4/2014 | Kim et al. |
| 2014/0113643 A1 | 4/2014 | Ma et al. |
| 2014/0146732 A1 | 5/2014 | Olufunmilola et al. |
| 2014/0148179 A1 | 5/2014 | Das et al. |
| 2014/0153439 A1 | 6/2014 | Nuss et al. |
| 2014/0155081 A1 | 6/2014 | Nuss |
| 2014/0155109 A1 | 6/2014 | Vaidya et al. |
| 2014/0169409 A1 | 6/2014 | Ma et al. |
| 2014/0185467 A1 | 7/2014 | Heo |
| 2014/0198678 A1 | 7/2014 | Kim et al. |
| 2014/0211739 A1 | 7/2014 | Kim et al. |
| 2014/0213274 A1 | 7/2014 | Weber et al. |
| 2014/0219117 A1 | 8/2014 | Meshkati et al. |
| 2014/0220990 A1 | 8/2014 | Lorca Hernando |
| 2014/0226736 A1 | 8/2014 | Niu et al. |
| 2014/0241316 A1 | 8/2014 | Okmyanskiy et al. |

(56) References Cited

U.S. PATENT DOCUMENTS

| | | |
|---|---|---|
| 2014/0243005 A1 | 8/2014 | Yanover et al. |
| 2014/0269355 A1 | 9/2014 | Monogioudis et al. |
| 2014/0273852 A1 | 9/2014 | McCormack et al. |
| 2014/0274195 A1* | 9/2014 | Singh ............... H04W 52/241 455/522 |
| 2014/0287769 A1 | 9/2014 | Taori |
| 2014/0293906 A1 | 10/2014 | Chang et al. |
| 2014/0301351 A1 | 10/2014 | Gao |
| 2014/0328277 A1 | 11/2014 | Xiao et al. |
| 2014/0335909 A1 | 11/2014 | Czerepinski |
| 2014/0342745 A1 | 11/2014 | Bhushan |
| 2015/0011222 A1 | 1/2015 | Brisebois et al. |
| 2015/0018028 A1 | 1/2015 | Uplenchwar et al. |
| 2015/0038190 A1 | 2/2015 | Carter et al. |
| 2015/0055479 A1 | 2/2015 | Reider |
| 2015/0063223 A1* | 3/2015 | Shen ............... H04W 52/265 370/329 |
| 2015/0063231 A1 | 3/2015 | Seo et al. |
| 2015/0087325 A1 | 3/2015 | Nuss et al. |
| 2015/0119063 A1 | 4/2015 | Yu et al. |
| 2015/0138981 A1 | 5/2015 | Nuss et al. |
| 2015/0146594 A1* | 5/2015 | Grayson ............ H04W 52/0206 370/311 |
| 2015/0148036 A1 | 5/2015 | Grayson et al. |
| 2015/0256314 A1 | 9/2015 | Gauvreau et al. |
| 2015/0296516 A1 | 10/2015 | Jung |
| 2015/0351072 A1 | 12/2015 | Okmyanskiy et al. |
| 2016/0007170 A1 | 1/2016 | Vaidya et al. |
| 2016/0007316 A1 | 1/2016 | Vaidya et al. |
| 2016/0007378 A1 | 1/2016 | Bertorelle |
| 2016/0037490 A1 | 2/2016 | Pazhyannur et al. |

FOREIGN PATENT DOCUMENTS

| | | |
|---|---|---|
| EP | 1322048 | 6/2003 |
| EP | 1718090 | 11/2006 |
| EP | 1895801 | 3/2008 |
| EP | 2296394 | 3/2011 |
| EP | 2337395 | 6/2011 |
| EP | 2395701 | 12/2011 |
| EP | 2445265 | 4/2012 |
| EP | 2466972 | 6/2012 |
| EP | 2533595 | 12/2012 |
| EP | 2728926 | 5/2014 |
| EP | 2741533 | 6/2014 |
| EP | 2306761 | 7/2014 |
| EP | 2757850 | 7/2014 |
| EP | 2770773 | 8/2014 |
| EP | 2832150 | 2/2015 |
| EP | 2879444 | 6/2015 |
| EP | 2981119 | 2/2016 |
| GB | 82496908 | 5/2013 |
| GB | 82518584 | 4/2015 |
| WO | WO98/24199 | 6/1998 |
| WO | WO00/38351 | 6/2000 |
| WO | WO2007/074373 | 7/2007 |
| WO | WO2007/133135 | 11/2007 |
| WO | WO2010/006909 | 1/2010 |
| WO | WO2010/064110 | 6/2010 |
| WO | WO2010/125151 | 11/2010 |
| WO | WO2011/085238 | 7/2011 |
| WO | WO2011/088465 | 7/2011 |
| WO | WO2011/090908 | 7/2011 |
| WO | WO2011/134529 | 11/2011 |
| WO | WO2011/137345 | 11/2011 |
| WO | WO2012/148009 | 1/2012 |
| WO | WO2012/055984 | 5/2012 |
| WO | WO2012/079604 | 6/2012 |
| WO | WO2013/005016 | 1/2013 |
| WO | WO2013/041574 | 3/2013 |
| WO | WO2013/082245 | 6/2013 |
| WO | WO2013/086659 | 6/2013 |
| WO | WO2013/112082 | 8/2013 |
| WO | WO2013/144950 | 10/2013 |
| WO | WO2013/169991 | 11/2013 |
| WO | WO2014/001025 | 3/2014 |
| WO | WO2014/059935 | 4/2014 |
| WO | WO2014/071308 | 5/2014 |
| WO | WO2014/087392 | 6/2014 |
| WO | WO2014/087393 | 6/2014 |

OTHER PUBLICATIONS

U.S. Appl. No. 14/687,198, filed Apr. 15, 2015, entitled "System and Method for Managing Interference in a Network Environment Based on User Presence," Inventors: Mark Grayson, et al.
EPO Mar. 26, 2015 Extended Search Report and Opinion from European Application Serial No. EP14190541.
"Cisco ASR 5000 Series Small Cell Gateway," Cisco White Paper, C11-711704-00, Jul. 2012, Cisco Systems, Inc., Printed in USA, © 2012 Cisco and/or its affiliates. All Rights Reserved. 6 pages.
"Cisco EnergyWise Management Suite—Data Sheet," Cisco Systems, Inc., C78-729774-00, Oct. 2013 © 2013 Cisco and/or its affiliates. All Rights Reserved. Printed in USA, 4 pages.
"Extensible Authentication Protocol," Wikipedia, the free encyclopedia, 10 pages [Retrieved and printed Oct. 11, 2013] http://en.wikipedia.org/wiki/Extensible_Authentication_Protocol#EAP-FAST.
"Link Layer Discovery Protocol," Wikipedia, the free encyclopedia, 4 pages, [Retrieved and printed Nov. 17, 2013] http://en.wikipedia.org/wiki/Link_Layer_Discovery_Protocol.
"Radius," Wikipedia, the free encyclopedia, 12 pages [Retrieved and printed Oct. 11, 2013] http://en.wikipedia.org/wiki/RADIUS.
3GPP TS 32.522 v11.2.0, "3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11)," 3GPP, 650 Route des Lucioles, F-06921 Sophia Antipolis Valbonne, France, Jun. 2012, 35 pages.
ETSI TS125 367 V9.4.0, "Universal Mobile Telecommunications System (UMTS); Mobility procedures for Home Node B (HNB); Overall description; Stage 2 (3GPP TS25.367 version 9.4.0 Release 9)", European Telecommunications Standards Institute, 650 Route des Lucioles, F-06921 Sophia Antipolis Cedex, France, Jun. 2010; 17 pages.
ETSI TS125 469 v11.2.0, "Universal Mobile Telecommunications System (UMTS); UTRAN Iuh interface Home Node B (HNB); Application Part (HNBAP) signalling (3GPP TS25.469 version 11.2.0 Release 11)," European Telecommunications Standards Institute, 650 Route des Lucioles, F-06921 Sophia Antipolis Cedex, France, Apr. 2013, 78 pages.
Horn, Gavin, "3GPP Femtocells: Architecture and Protocols," Qualcomm Incorporated, 5775 Morehouse Drive, San Diego, CA, Sep. 2010; 64 pages.
Nivaggioli, Patrice, "Cisco Small Cell Architecture," Cisco Connect, Dubrovnik, Croatia, South East Europe, May 20-22, 2013, © 2012 Cisco and/or its affiliates. All Rights Reserved.; 40 pages.
"ETSI TR 136 902 V9.3.1 (May 2011) Technical Report: LTE; Evolved Universal Terrestrial Radio Access Network 9E-UTRAN); Self-configuring and self-optimizing network (SON) use cases and solutions (3GPP TR 36.902 version 9.3.1 Release 9)," ETSI, European Telecommunications Standards Institute, 650 Route des Lucioles F-06921 Sophia Antipolis Cedex—France, May 2011; 23 pages.
"ETSI TS 123 401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9)," ETSI, 650 Route des Lucioles, F-06921, Sophia Antipolis Cedex—France, Jun. 2010; See Section 4, pp. 15-46.
"ETSI TS 123 401 V12.70 (Jan. 2015) Technical Specification:" LTE; General Packet Radio Service (GPRS) enhancements for Evolved Universal Terrestrial Radio Access Network (E-UTRAN) access (EGPP TS 23.401 version 12.7.0 Release 12), Section 4 only,

(56) References Cited

OTHER PUBLICATIONS

European Telecommunications Standards Institute, 650 Route des Lucioles, F-06921 Sophia Antipolis Cedex, France; Jan. 2015; 77 pages.
"ETSI TS 125 133 V12.6.0 (Jan. 2013) Technical Specification: Universal Mobile Telecommunications System 9UMTS); Requirements for support of radio resource management (FDD) (3GPP TS 25.133 version 12.6.0 Release 12);" ETSI, European Telecommunications Standards Institute 2012, 650 Route des Lucioles, F-06921 Sophia Antipolis Cedex—France, Jan. 2015; 368 pages.
"ETSI TS 125 215 V 12.0.0 (Sep. 2014) Technical Specification: Universal Mobile Telecommunications System (UMTS); Physical layer; Measurements (FDD) (3GPP TS 25.215 version 12.0.0 Release 12);" ETSI, European Telecommunications Standards Institute 2012, 650 Route des Lucioles, F-06921 Sophia Antipolis Cedex—France, Sep. 2014; 26 pages.
"ETSI TS 125 224 V12.0.0 (Sep. 2014) Technical Specification: Universal Mobile Telecommunications System (UMTS); Physical layer procedures (TDD) (3GPP TS 25.224 version 12.0.0 Release 12);" ETSI, European Telecommunications Standards Institute 2012, 650 Route des Lucioles, F-06921 Sophia Antipolis Cedex—France, Sep. 2014; 86 pages.
"ETSI TS 125 331 V11.10.0 (Jul. 2014) Technical Specification: Universal Mobile Telecommunications System (UMTS); Radio Resource Control (RRC); Protocol Specification," ETSI, 650 Route des Lucioles, F-06921, Sophia Antipolis Cedex—France, Jul. 2014, © European Telecommunications Standards Institute 2014. All Rights Reserved. [Relevant Portions: §7.2.2 pp. 55-58; §8.1.2 pp. 105-108; §8.1.4 pp. 126-129; §8.3.1 pp. 215-260; §8.3.8-8.3.9 pp. 289-292; §8.5.21 pp. 357-365; §10.2.7 pp. 620-623; Annex B.3 pp. 2045-2052].
"ETSI TS 125 367 V9.4.0," Universal Mobile Telecommunications System (UMTS); Mobility procedures for Home Node B (HNB); Overall description; Stage 2 (3GPP TS25.367 version 9.4.0 Release 9, European Telecommunications Standards Institute, 650 Route des Lucioles, F-06921 Sophia Antipolis Cedex, France, Jun. 2010; 17 pages.
"ETSI TS-125-469 V9.3.0 (Oct. 2010) Technical Specification: Universal Mobile Telecommunications System (UMTS); UTRAN luh interface Home Node B (HNG) Application Part (HNBAP) signaling (3GPP TS 25.469 version 9.3.0 Release 9)," © European Telecommunications Standards Institute 2010; Oct. 2010; 64 pages.
"ETSI TS 128 657 V11.0.0 (Feb. 2013) Technical Specification: Universal Mobile Telecommunications System 9UMTS); LTE; Telecommunication management; Evolved Universal Terrestrial Radio Access Network 9E-UTRAN) Network Resource Model (NRM); Integration Reference Point (IRP); Requirements (3GPP TS 28.657 version 11.0.0 Release 11)," ETSI, European Telecommunications Standards Institute, 650 Route des Lucioles, F06921 Sophia Antipolis Cedex—France, Feb. 2013; 9 pages.
"ETSI TS 128 658 V11.0.0 (Feb. 2013) Technical Specification: Universal Mobile Telecommunications System 9UMTS); LTE; Telecommunication management; Evolved Universal Terrestrial Radio Access Network (E-UTRAN) Network Resource Model (NRM) Integration Reference Point (IRP); Information Service (IS) (3GPP TS 28.658 version 11.0.0 Release 11)," ETSI, European Telecommunications Standards Institute 2012, 650 Route des Lucioles, F-06921 Sophia Antipolis Cedex—France, Feb. 2013; 53 pages.
"ETSI TS 128 659 V11.0.0 (Jan. 2013) Technical Specification: Universal Mobile Telecommunications Systems (UMTS); LTE; Telecommunications Management; Evolved Universal Terrestrial Radio Access Network (E-UTRAN) Network Resource Model (NRM) Integration Reference Point (IRP); Solution Set (SS) definitions (3GPP TS 28.659 version 11.0.0 Release 11)," ETSI, European Telecommunications Standards Institute 2012, 650 Route des Lucioles, F-06921 Sophia Antipolis Cedex—France, Jan. 2013; 48 pages.
"ETSI TS 129 212 V12.6.0 (Oct. 2014) Technical Specification: Universal Mobile Telecommunications System (UMTS); LTE; Policy and Charging Control (PCC); Reference Points (EGPP TS 29.212 version 12.6.0 Release 12)," ETSI, 650 Route des Lucioles, F-06921, Sophia Antipolis Cedex—France, Oct. 2014, 232 pages.
"ETSI TS 129 213 V12.5.0 (Oct. 2014) Technical Specification: Digital Cellular Telecommunications System (Phase 2+); Universal Mobile Telecommunications System (UMTS); LTE; Policy and charging control signalling flows and Quality of Service (QoS) parameter mapping (3GPP TS 29.213 version 12.5.0 Release 12),"[Relevant Sections 3, 4, 8 and 8 only], ETSI, 650 Route des Lucioles, F-06921, Sophia Antipolis Cedex—France, Oct. 2014.
"ETSI TS 129 214 V12.5.0 (Oct. 2014) Technical Specification: Universal Mobile Telecommunications System (UMTS); LTE; Policy and charging control over Rx reference point (3GPP TS 29.214 version 12.5.0 Release 12)," ETSI, 650 Route des Lucioles, F-06921, Sophia Antipolis Cedex—France, Oct. 2014; 64 pages.
"ETSI TS 136 111 V12.0.0 (Oct. 2014) Technical Specification: LTE; Location Measurement Unit (LMU) performance specification; Network based positioning systems in Evolved Universal Terrestrial Radio Access Network (E-UTRAN) (3GPP TS 36.111 version 12.0.0 Release 12);" ETSI, European Telecommunications Standards Institute 2012, 650 Route des Lucioles, F-06921 Sophia Antipolis Cedex—France; Oct. 2014.
"ETSI TS 136 133 V12.5.0 (Nov. 2014) Technical Specification: LTE; Evolved Universal Terrestrial Radio Access (E-UTRA); Requirements for support of radio resource management (3GPP TS 36.133 version 12.5.0 Release 12)," [Relevant Sections 8-10 only]; ETSI, 650 Route des Lucioles, F-06921, Sophia Antipolis Cedex—France, Nov. 2014.
"ETSI TS 136 133 V12-9-0 (Oct. 2015) Technical Specification: LTE; Evolved Universal Terrestrial Radio Access (E-UTRA); Requirements for support of Radio Resource management (3GPP TS 36.133 version 12.9.0 Release 12)," ETSI, European Telecommunications Standards Institute, 650 Route des Lucioles F-06921 Sophia Antipolis Cedex—France, Oct. 2015 Sections 1 thru 9 only; 252 pages.
"ETSI TS 136 201 V12.1.0 (Feb. 2015) Technical Specificaton: LTE; Evolved Universal Terrestrial Radio Access (E-UTRA); LTE physical layer; General description (3GPP TS 36.201 version 12.1.0 Release 12);" ETSI, European Telecommunications Standards Institute 2012, 650 Route des Lucioles, F-06921 Sophia Antipolis Cedex—France, Feb. 2015; 15 pages.
"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12);" ETSI, European Telecommunications Standards Institute, 650 Route des Lucioles F-06921 Sophia Antipolis Cedex—France; Apr. 2015.
"ETSI TS 136 213 V12.4.0 (Feb. 2015) Technical Specification: LTE; Evolved Universal Terrestrial Radio Access (E-UTRA); Physical layer procedures (3GPP TS 36.213 version 12.4.0 Release 12);" ETSI, European Telecommunications Standards Institute 2012, 650 Route des Lucioles, F-06921 Sophia Antipolis Cedex—France, Feb. 2015; 227 pages.
"ETSI TS 136 213 V12.7.0 (Oct. 2015) Technical Specificaton: LTE; Evolved Universal Terrestrial Radio Access (E-UTRA); Physical layer procedures (3GPP TS 36.213 version 12.7.0 Release 12);" ETSI, European Telecommunications Standards Institute, 650 Route des Lucioles F-06921 Sophia Antipolis Cedex—France, Oct. 2015; 243 pages.
"ETSI TS 136 213 V9.3.0 (Oct. 2010) Technical Specification: LTE; Evolved Universal Terrestrial Radio Access (E-UTRA); Physical layer procedures (3GPP TS 36.213 version 9.3.0 Release 9);" ETSI, European Telecommunications Standards Institute 2012, 650 Route des Lucioles, F-06921 Sophia Antipolis Cedex—France; Oct. 2010.
"ETSI TS 136 214 V9.2.0 (Jun. 2010) Technical Specificaton: LTE; Evolved Universal Terrestrial Radio Access (E-UTRA); Physical layer; Measurements (3GPP TS 36.214 version 9.2.0 Release 9);" ETSI, European Telecommunications Standards Institute 2012, 650 Route des Lucioles, F-06921 Sophia Antipolis Cedex—France; Jun. 2010.
"ETSI TS 136 300 V12-7-0 (Oct. 2015) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 12.7.0 Release

(56) References Cited

OTHER PUBLICATIONS

12);" ETSI, European Telecommunications Standards Institute, 650 Route des Lucioles F-06921 Sophia Antipolis Cedex—France, Oct. 2015; 264 pages.
"ETSI TS 136 304 V12-6-0 (Nov. 2015) Technical Specification: LTE; Evolved Universal Terrestrial Radio Access (E-UTRA); User Equipment (UE) procedures in idle mode (3GPP TS 36.304 version 12.6.0 Release 12);" ETSI, European Telecommunications Standards Institute, 650 Route des Lucioles F-06921 Sophia Antipolis Cedex—France, Nov. 2015; 40 pages.
"ETSI TS 136 321 V12.7.0 (Oct. 2015) Technical Specification: LTE; Evolved Universal Terrestrial Radio Access (E-UTRA); Medium Access Control (MAC) protocol specification (3GPP TS 36.321 version 12.7.0 Release 12);" ETSI, European Telecommunications Standards Institute, 650 Route des Lucioles F-06921 Sophia Antipolis Cedex—France, Oct. 2015; 79 pages.
"ETSI TS 136 331 V12.3.0 (Sep. 2014) Technical Specificaton: LTE; Evolved Universal Terrestrial Radio Access (E-UTRA); Radio Resource Control (RRC); Protocol specification (3GPP TS 36.311 version 12.3.0 Release 12)," [Relevant Section 5.3.2 only]; ETSI, 650 Route des Lucioles, F-06921, Sophia Antipolis Cedex—France, Sep. 2014.
"ETSI TS 136 331 V12.7.0 (Oct. 2015) Technical Specification: LTE; Evolved Universal Terrestrial Radio Access (E-UTRA); Radio Resource Control (RRC); Protocol Specification (3GPP TS 36.331 version 12.7.0 Release 12);" ETSI, European Telecommunications Standards Institute, 650 Route des Lucioles F-06921 Sophia Antipolis Cedex—France, Oct. 2015; 455 pages.
"ETSI TS 136 423 V8.3.0 (Nov. 2008) Technical Specification: LTE; Evolved Universal Terrestrial Radio Access Network (E-UTRAN); X2 Application Protocol (X2AP) (3GPP TS 36.423 version 8.3.0 Release 8);" ETSI, European Telecommunications Standards Institute 2012, 650 Route des Lucioles, F-06921 Sophia Antipolis Cedex—France; Nov. 2008.
"ETSI TS 136 211 V12.4.0 (Feb. 2015) Technical Specification: LTE; Evolved Universal Terrestrial Radio Access (E-UTRA); Physical channels and modulation (3GPP TS 36.211 version 12.4.0 Release 12);" ETSI, European Telecommunications Standards Institute 2012, 650 Route des Lucioles, F-06921 Sophia Antipolis Cedex—France, Feb. 2015; 126 pages.
"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12);" ETSI, European Telecommunications Standards Institute 2012, 650 Route des Lucioles, F-06921 Sophia Antipolis Cedex—France, Apr. 2015; 139 pages.
"ETSI TS 136 212 V12.3.0 (Feb. 2015) Technical Specification: LTE; Evolved Universal Terrestrial Radio Access (E-UTRA); Multiplexing and channel coding (3GPP TS 36.212 version 12.3.0 Release 12);" ETSI, European Telecommunications Standards Institute 2012, 650 Route des Lucioles, F-06921 Sophia Antipolis Cedex—France, Feb. 2015; 91 pages.
"ETSI TS 136 213 V 12.4.0 (Feb. 2015) Technical Specification: LTE; Evolved Universal Terrestrial Radio Access (E-UTRA); Physical layer procedures (3GPP TS 36.213 version 12.4.0 Release 12);" ETSI, European Telecommunications Standards Institute 2012, 650 Route des Lucioles F-06921 Sophia Antipolis Cedex—France, Feb. 2015; 227 pages.
"ETSI TS 136 212 V12.6.0 (Oct. 2015) Technical Specification: LTE; Evolved Universal Terrestrial Radio Access (E-UTRA); Multiplexing and channel coding (3GPP TS 36.212 version 12.6.0 Release 12);" ETSI, European Telecommunications Standards Institute, 650 Route des Lucioles F-06921 Sophia Antipolis Cedex—France, Oct. 2015; 96 pages.
"ETSI TS 136 214 V10.1.0 (Apr. 2011) Technical Specification: LTE; Evolved Universal Terrestrial Radio Access (E-UTRA); Physical layer; Measurements (3GPP TS 36.214 version 10.1.0 Release 10);" ETSI, European Telecommunications Standards Institute 2012, 650 Route des Lucioles F-06921 Sophia Antipolis Cedex—France, Apr. 2011; 15 pages.
"ETSI TS 136 300 V10.2.0 (Jan. 2011) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 10.2.0 Release 10);" ETSI, European Telecommunications Standards Institute 2012, 650 Route des Lucioles, F-06921 Sophia Antipolis Cedex—France, Jan. 2011; 208 pages.
"ETSI TS 136 300 V12.4.0 (Feb. 2015) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 12.4.0 Release 12);" ETSI, European Telecommunications Standards Institute 2012, 650 Route des Lucioles, F-06921 Sophia Antipolis Cedex—France, Feb. 2015; 266 pages.
"ETSI TS 136 423 V11.3.0 (Jan. 2013) Technical Specification: LTE; Evolved Universal Terrestrial Radio Access Network (E-UTRAN); X2 Application Protocol (X2AP) (3GPP TS 36.423 version 11.3.0 Release 11)," ETSI, European Telecommunications Standards Institute 2012, 650 Route des Lucioles, F-06921 Sophia Antipolis Cedex—France, Jan. 2013; 143 pages.
"ETSI TS 136 423 V12.4.2 (Feb. 2015) Technical Specification: LTE; Evolved Universal Terrestrial Radio Access Network (E-UTRAN); X2 Application Protocol (X2AP) (3GPP TS 36.423 version 12.4.2 Release 12);" ETSI, European Telecommunications Standards Institute 2012, 650 Route des Lucioles, F-06921 Sophia Antipolis Cedex—France, Feb. 2015; 205 pages.
"ETSI TS-136-423 V9.4.0 (Oct. 2010) Technical Specification: LTE; Evolved Universal Terrestrial Radio Access Network (E-UTRAN); X2 Application Protocol (X2AP) (3GPP TS 36.423 version 9.4.0 Release 9)," ETSI, European Telecommunications Standards Institute, 650 Route des Lucioles F-06921 Sophia Antipolis Cedex—France, Oct. 2010, Section 8.3.8.
"ETSI GS NFV 002 V1.1.1 (Oct. 2013) Group Specification: Network Functions Virtualisation (NFV); Architectural Framework," ETSI, European Telecommunications Standards Institute, 650 Route des Lucioles F-06921 Sophia Antipolis Cedex—France, Oct. 2013; 21 pages.
"3GPP LTE Packet Data Convergence Protocol (PDCP) Sub Layer," EventHelix.com Inc., first published on or about Jan. 1, 2010; 20 pages.
"3GPP TR23.705 V0.11.0 (May 2014) Technical Report: 3rd Generation Partnership Project; Technical Specification Group Services and System Aspects; Study on system enhancements for user plane congestion management (Release 13)," 3GPP, 650 Route des Lucioles, F-06921, Sophia Antipolis Cedex—France, May 2014, 64 pages.
"3GPP TR 36.814 V9.0.0 (Mar. 2010) Technical Report: 3rd Generation Partnership Project; Technical Specification Group Radio Access Network; Evolved Universal Terrestrial Radio Access (E-UTRA); Further advancements for E-UTRA physical layer aspects (Release 9);" 3rd Generation Partnership Project (3GPP), Mar. 2010.
"3GPP TR 23.852 (V12.0.0 (Sep. 2013) Technical Report: 3rd Generational Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12);" 3rd Generation Partnership Project (3GPP), Sep. 2013, 157 pages.
"3GPP TS23.002 V12.5.0 (Jun. 2014) Technical Specification: 3rd Generation Partnership Project; Technical Specification Group Services and System Aspects; Network architecture (Release 12)," 3GPP, 650 Route des Lucioles, F-06921, Sophia Antipolis Cedex—France, Jun. 2014; See Sections 1-5, pp. 11-76.
"3GPP TS 23.401 V13.3.0 (Jun. 2015) Technical Specification: 3rd Generation Partnership Project; Technical Specification Group Services and System Aspects;General Packet Radio Service (GPRS) enhancements for Evolved Universal Terrestrial Radio Access Network (E-UTRAN) access (Release 13)," 3rd Generation Partnership Project, 650 Route des Lucioles-Sophia Antipolis Valbonne—France, Jun. 2015; Sections 4 and 5 only.

(56) References Cited

OTHER PUBLICATIONS

"3GPP TS 25.367 V11.0.0 (Jun. 2012) Technical Specification: Group Radio Access Network; Mobility procedures for Home Node B (HNG); Overall description; Stage 2 (Release 11)," 3rd Generation Partnership Project, Mobile Competence Centre; 650, Route Des Lucioles; F-06921 Sophia-Antipolis Cedex; France; Jun. 2012, 14 pages.
"3GPP TS 29.212 V12.5.2 (Jul. 2014) Technical Specification: 3rd Generation Partnership Project; Technical Specification Group Core Network and Terminals; Policy and Charging Control (PCC); Reference Points (Release 12)," 3GPP, 650 Route des Lucioles, F-06921, Sophia Antipolis Cedex—France, Jul. 2014; Section 4, pp. 17-88.
"3GPP TS 36.300 V11.3.0 (Sep. 2012) Technical Specification: Group Radio Access Network; Evolved Universal Terrestrial Radio Access (E-UTRA) and Evolved Universal Terrestrial Radio Access Network (E-UTRAN); Overall Description; Stage 2 (Release 11)," 3rd Generation Partnership Project, Mobile Competence Centre; 650, Route Des Lucioles; F-06921 Sophia-Antipolis Cedex; France; Sep. 2012, 205 pages.
"3GPP TS 36.413 V9.5.1 (Jan. 2011)Technical Specification: 3rd Generation Partnership Project; Technical Specification Group Radio Access Network; Evolved Universal Terrestrial Radio Access Network (E-UTRAN); S1 Application Protocol (S1AP) (Release 9);" 3rd Generation Partnership Project, Jan. 2011.
"3GPP TS 37.320 V11.1.0 (Sep. 2012) Technical Specification: Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11)," 3rd Generation Partnership Project, Mobile Competence Centre; 650, Route Des Lucioles; F-06921 Sophia-Antipolis Cedex; France; Sep. 2012, 21 pages.
"3GPP TS 48.008 V8.8.0 (Dec. 2009) Technical Specification: 3rd Generation Partnership Project; Technical Specification Group GSM/EDGE Radio Access Network; Mobile Switching Centre—Base Station System (MSC-BSS) interface; Layer 3 specification (Release 8);" 3rd Generation Partnership Project, Mobile Competence Centre; 650, Route Des Lucioles; F-06921 Sophia-Antipolis Cedex; France; Dec. 2009; 208 pages.
"3GPP Draft TR_R3018_V_100 (Oct. 2007) Technical Specification: Group Radio Access Network; Evolved UTRA and UTRAN; Radio Access Architecture and Interfaces (Release 7)," 3rd Generation Partnership Project, Mobile Competence Centre; 650, Route Des Lucioles; F-06921 Sophia-Anti polis Cedex; France; Oct. 2007, XP050423659.
3GPP Draft R1-124276, Research in Motion UK Limited, "Scoping the UMTS HetNet Study," 3rd Generation Partnership Project (3GPP), Mobile Competence Centre; 650; Route Des Lucioles; F-06921 Sophia-Antipolis; Sep. 2012; XP050662177.
3GPP Draft R3-071432, Telecom Italia, et al., "Self-optimization use case: self-tuning of cell reselction parameters for load balancing," 3rd Generation Partnership Project (3GPP), Mobile Competence Centre; 650; Route Des Lucioles; F-06921 Sophia-Antipolis; Aug. 2007 XP050162260.
3GPP TSG-RAN WG3 #61bis, R3-081174, "Solution for interference reduction SON use case," Orange, Alcatel-Lucent, Agenda Item 10.1.1c; Kansas City, MO, USA, May 5-9, 2008; 6 pages.
3GPP-TSG-RAN WG3 Meeting #60, R3-081123, "Dynamic Setup of HNBs for Energy Savings and Interference Reduction," Mitsubishi Electric, Agenda Item 10.1.1c; Kansas City, MO USA, May 5-9, 2008; 6 pages.
3GPP-TSG-RAN3 #59, R3-080082, "Capacity and Coverage SON Use Case," Alcatel-Lucent, Agenda Item 10.1.1.c; Sorrento, Italy, Feb. 11-15, 2008; 4 pages.
"4G++: Advanced Performance Boosting Techniques in 4th Generation Wireless Systems; A National Telecommunication Regulatory Authority Funded Project; Deliverable D4.1, Work Package 4, Inter-Cell Interference Coordination," 4G++ Project, Funded by the Egyptian National Telecommunications Regulatory Authority (NTRA); 75 pages First published on or about Sep. 15, 2015.

Adrangi, F., et al., "Chargeable User Identity," Network Working Group RFC 4372, Jan. 2006, 10 pages.
Andrews, Matthew, et al., "Optimal Utility Based Multi-User Throughput Allocation Subject to Throughput Constraints," IEEE INFOCOM 2005, Mar. 13-17, 2005, Miami, FL; 10 pages.
Ashraf, Imran, "Distributed Radio Coverage Optimization in Enterprise Femtocell Networks," International Conference on Communications ICC 2010, May 23-27, 2010, Cape Town, South Africa; 6 pages.
Baid, Akash, et al., "Delay Estimation and Fast Iterative Scheduling Policies for LTE Uplink," HAL archives-ouvertes; HAL Id: hal-00763374, Submitted on Dec. 10, 2012; 9 pages https://hal.inria.fr/hal-00763374.
Basir, Adnan, "3GPP Long Term Evolution (LTE), ICIC and eICIC," posted Jun. 11, 2012; 5 pages; http://4g-lte-world-blogspot.com/2012/06/icic-and-eicic.html.
Bernardos, Carlos J., et al., "Challenges of Designing Jointly the Backhaul and Radio Access Network in a Cloud-based Mobile Network," Future Network & Mobile Summit 2013 Conference Proceedings, Jul. 2013; 10 pages.
"Bisection Method," Wikipedia, the free encyclopedia, Aug. 26, 2015; 5 pages.
"Block Error Ratio (BLER) Measurement Description," Keysight Technologies, Feb. 28, 2014; 3 pages; http://rfmw.em.keysight.com/rfcomms/refdocs/wcdma/wcdma_meas_wblerror_desc.html.
"Broadband Forum Technical Report: TR-069 CPE WAN Management Protocol," Issue: 1, Amendment 4, Issue Date: Jul. 2011 Protocol Version 1.3; © The Broadband Forum; 190 pages.
"Broadband Forum Technical Report: TR-069 CPE WAN Management Protocol," Issue: 1, Amendment 5, Issue Date: Nov. 2013 CWMP Version 1.4; © The Broadband Forum; 228 pages.
"Broadband Forum Technical Report: TR-196 Frmto Access Point Service Data Model," Issue: 2, Issue Date: Nov. 2011; 46 pages.
Calhoun, P., "Diameter Base Protocol," Network Working Group RFC 3488, Sep. 2003; 147 pages.
Chauhan, Himanshu, "UE Measurements and Reporting in UMTS," Wireless Technologies, Blog dated Apr. 26, 2013; 3 pages http://worldtechieumts.blogspot.com/2013/04/ue-measurements-and-reporting-in-umts.html.
"Cisco Licensed Small Cell Solution: Reduce Costs, Improve Coverage and Capacity—Solution Overview," Cisco Systems, Inc., C22-726686-00, Feb. 2013, © 2013 Cisco and/or its affiliates. All Rights Reserved. Printed in USA, 13 pages.
"Cisco's One Platform Kit (onePK)," Networking Software (IOS & NX-OS), Cisco Systems, Inc., First published on or about Mar. 3, 2014; 2 pages.
Claussen, Holger, et al., "Self-optimization of Coverage for Femtocell Deployments," DOI 10:10.1109/WTS2008 Wireless Telecommunications Symposium, Apr. 26-28, 2008; Pomona, CA; 8 pages.
Do, Dr. Michelle M., et al., "Interference Coordination in LTE/LTE-A (2): eICIC (enhanced ICIC)," Netmanias Tech Blog, Aug. 6, 2014; 6 pages http://www.netmanias.com/en/post/blog/6551/lte-lte-a-eicic/interference-coordination-in-lte-lte-a-2-eicic-enhanced-icic.
Droms, R., "Dynamic Host Configuration Protocol," Network Working Group RFC 2131, Mar. 1997; 45 pages.
"E Band," from Wikipedia, the free encyclopedia, Dec. 24, 2013; 3 pages.
"EEM Configuration for Cisco Integrated Services Router Platforms," Configuration Guide for Cisco IOS® Embedded Event Manager (EEM), Cisco Systems, Inc., Feb. 2008; 17 pages.
Ericsson, "R4-153549: Agenda Item 7.9.3.1—SFN and subframe offset reporting for dual connectivity," 3GPP TSG RAN WG4 Meeting #75, Fukuoka, Japan, May 25-29, 2015.
Ericsson, et al., "LPN Range Expansion in Co-Channel Deployment in Heterogeneous Networks," 3GPP Draft R1-125219, , 3rd Generation Partnership Project (3GPP), Mobile Competence Centre; 650; Route Des Lucioles; F-06921 Sophia-Antipolis; Nov. 2012, 7pages.
Ericsson, et al., "On the Feasibility of Operational Carrier Selection," 3GPP Draft R3-112991, 3rd Generation Partnership Project (3GPP), Mobile Competence Centre; 650; Route Des Lucioles; F-06921 Sophia-Antipolis; Nov. 2011, 7 pages.

(56) References Cited

OTHER PUBLICATIONS

"Fading," from Wikipedia, the free encyclopedia, Apr. 10, 2015; 6 pages.
"Frame Structure—Downlink," Share Technote, first published on or about Jul. 9, 2012; 13 pages; http://www.sharetechnote.com/html/FrameStructure_DL_html.
"Fuzzy Logic," from Wikipedia, the free encyclopedia, Dec. 3, 2015; 12 pages.
Freescale Semiconductor, "Long Term Evolution Protocol Overview," White Paper, Document No. LTEPTCLOVWWP, Oct. 2008; 21 pages.
Ghaffar, Rizwan, et al., "Fractional Frequency Reuse and Interference Suppression for OFDMA Networks," published in "WiOpt" 10: Modeling and Optimization in Mobile, Ad Hoc, and Wireless Networks (2010), Jul. 19, 2010, 5 pages.
Goldsmith, A.J., et al., "Variable Rate Variable-Power MQAM for Fading Channels," IEEE Trans. on Comm. vol. 45, No. 10, Oct. 1997.
"GSMA LTE Roaming Guidelines, Version 9.0," GSM Association, Official Document IR88, Jan. 24, 2013; 53 pages.
Guttman, E., et al., "Service Location Protocol, Version 2," Network Working Group RFC 2608, Jun. 1999, 57 pages.
Haverinen, H., "Extensible Authentication Protocol Method for Global System for Mobile Communications (GSM) Subscriber Identity Modules (EAP-SIM)," Network Working Group RFC 4186, Jan. 2006, 93 pages.
Holappa, Mikko, "Performance Comparison of LTE ENODEB OSI Layer 2 Implementations; Preemptive Partitioned Scheduling vs. Non-Preemptive Global Scheduling," Master's Thesis, Degree Programme in Information Networks; Oulun Yliopisto, University of OULU, Department of Computer Science and Engineering; Oct. 2013, 66 pages.
Holbrook, H., et al., "Source-Specific-Multicast for IP," Network Working Group RFC 4607, Aug. 2006.
"Hysteresis," from Wikipedia, the free encyclopedia; Oct. 1, 2015.
"Hybrid Automatic Repeat Request," from Wikipedia, the free encyclopedia, Jun. 8, 2015; 4 pages.
Ku, Gwanmo, "Resource Allocation in LTE," Adaptive Signal Processing and Information Theory Research Group, Nov. 11, 2011; 33 pages.
Kwan, R., et al., "A Survey of Scheduling and Interference Mitiation in LTE," vol. 2010, Article ID 273486, May 30, 2010.
Kwan, R., et al., "On Radio Admission Control for LTE Systems," Proc. of IEEE VTC-fail, Sep. 6-9, 2010.
La Rocca, Maurizio, "RSRP and RSRQ Measurement in LTE," laroccasolutions Technology & Services, Feb. 2, 2015; 9 pages http://www.laroccasolutions.com/training/78-rsrp-and-rsrq-measurement-in-lte.
Leung, K., et al., "WiMAX Forum/3GPP2 Proxy Mobile IPv4," Independent Submission RFC 5563, Feb. 2010; 41 pages.
Lopez-Perez, D., et al., "Interference Avoidance and Dynamic Frequency Planning for WiMAX Femtocells Networks," Proceedings of ICCS, Jun. 23-25, 2008.
LteWorld, "Packet Data Convergence Protocol (PDCP)," Information Page, LteWorld.org, published on or about Jan. 2, 2013; 2 pages.
"LTE Physical Layer Overview," Keysight Technologies, first published on or about Aug. 24, 2014; 11 pages http://rfmw.em.keysight.com/wireless/helpfiles/89600B/webhelp/subsystems/lte/content/lte_overview.htm.
"LTE Frame and Subframe Structure," Cellular/Mobile Telecommunications, Tutorial, Radio-Electronics.com; first published on or about Aug. 6, 2009 http://www.radio-electronics.com/info/cellulartelecomms/lte-long-term-evolution/lte-frame-subframe-structure.php.
"LTE Layers Data Flow," LTE Tutorial, tutorialspoint; first published on or about Jan. 17, 2013; 3 pages http://www.tutorialspoint.com/lte/lte_layers_data_flow.htm.
"LTE Protocol Stack Layers," LTE Tutorial, tutorialspoint; first published on or about Jan. 16, 2013 http://www.tutorialspoint.com/lte/lte_protocol_stack_layers.htm.
"LTE Quick Reference," from Share Technote; first published on or about Nov. 28, 2012; http://www.sharetechnote.com/html/Handbook_LTE_RNTI.html.
"LTE Quick Reference: CCE Index Calculation," LTE Handbook, Share Technote, first published on or about Jul. 8, 2012 http://www.sharetechnote.com/html/Handbook_LTE_CCE_Index.html.
"LTE Quick Reference: Resource Allocation and Management Unit," LTE Handbook, Share Technote, first published on or about Jul. 13, 2012 http://www.sharetechnote.com/html/Handbook_LTE_ResourceAllocation_ManagementUnit.html.
"LTE TDD Overview," from ShareTechnote; first published on or about Jul. 2, 2014 http://www.sharetechnote.com/html/LTE_TDD_Overview.html.
Madan, Ritesh, et al., "Fast Algorithms for Resource Allocation in Wireless Cellular Networks," IEEE/ACM Transactions on Networking, vol. 18, No. 3, Jun. 2010; 12 pages.
Mehlfuhrer, M., et al., "Simulating the Long Term Evolution Physical Layer," Proc. of 17th European Signal Processing Conference (EUSIPCO), Aug. 24-28, 2009.
Narten T., et al., "Neighbor Discovery for IP version 6 (IPv6)," Network Working Group RFC 4861, Sep. 2007; 97 pages.
NGMN Alliance, "Further Study on Critical C-RAN Technologies," Next Generation Mobile Networks, Mar. 31, 2015; 93 pages.
Nokia Corporation, et al., "SON WI Status Overview," 3GPP Draft R2-093231, 3rd Generation Partnership Project (3GPP), Mobile Competence Centre; 650; Route Des Lucioles; F-06921 Sophia-Antipolis; Apr. 2009.
Novlan, Thomas David, et al., "Analytical Evaluation of Fractional Frequency Reuse for OFDMA Cellular Networks," arXiv: 1101.5130v1 [cs.IT]; arXiv.org, Cornell University Library; Jan. 26, 2011, 25 pages.
Okubo, Naoto, et al., "Overview of LTE Radio Interface and Radio Network Architecture for High Speed, High Capacity and Low Latency," Special Articles on "Xi" (Crossy) LTE Services—Toward Smart Innovation—Technology Reports; NTT DOCOMO Technical Journal vol. 13 No. 1, Jun. 2011.
Park, Jeongho, et al., "Interference Level Control in Mobile WiMAX Uplink System," 2009 IEEE Mobile WiMAX Symposium, Jul. 9-10, 2009; 5 pages.
"Paging Channel Selection," UMTS World; first published on or about Jun. 22, 2003; 3 pages http://www.umtsworld.com/technology/paging.html.
"Paging Indicator Channel PICH Work in 3G," Teletopix.org, Telecom Techniques Guide, Feb. 13, 2014, 2 pages http://www.teletopix.org/3g-wcdma/paging-indicator-channel-pich-work-in-3g/.
"PDCCH Construction, Expert Opinion," posted by Hongyan on May 20, 2011; LTE University, 4 pages http://lteuniversity.com/get_trained/expert_opinion1/b/hongyanlei/archive/2011/05/20/pdcch-construction.aspx.
"PDCCH Processing," published by Gio Zakradze on Dec. 29, 2014; 56 pages.
"Plane (in networking)," Definition from WhatIs.com; Jan. 2013 http://whatis.techtarget.com/definition/plane-in-networking.
Piro, G., et al., "An LTE module for the ns-3 Network Simulator," in Proc. of Wns3 2011 (in conjunction with SimuTOOLS 2011), Mar. 2011, Barcelona Spain.
Qualcomm Incorporation: "Design Objectives and Deployment Scenarios for Hetnets," 3GPP Draft R1-124528, 3rd Generation Partnership Project (3GPP), Mobile Competence Centre; 650; Route Des Lucioles; F-06921 Sophia-Antipolis; Sep. 2012, XP050662404.
"Quadrature amplitude modulation," from Wikipedia, the free encyclopedia, Apr. 22, 2015; 11 pages.
"QoS Class Identifier," from Wikipedia, the free encyclopedia, Oct. 7, 2015.
"Received signal strength indication," Wikipedia, the free encyclopedia, Dec. 22, 2014; 2 pages.
Rengarajan, Balaji, "A Semi-autonomous Algorithm for Self-organizing Dynamic Fractional Frequency Reuse on the Uplink of OFDMA Systems," Dec. 14, 2009; 22 pages.

(56) References Cited

OTHER PUBLICATIONS

"RSRP, EPRE, Total Power," LTE Quick Reference from Sharetechnote.com; first published on or about Aug. 3, 2014; http://www.sharetechnote.com/html/Handbook_LTE_RSRP_EPRE_TotalPower.html.

Ruby, Ruksana, et al., "Uplink Scheduling Solution for Enhancing Throughput and Fairness in Relayed Long-Term Evoluation Networks," IET Communications 2014, vol. 8, Issue 6, Apr. 2014; 13 pages.

Saad, Sawsan A., et al., "A Survey on Power Control Techniques in Femtocell Networks," Journal of Communications vol. 8, No. 12, Dec. 2013; 10 pages.

Sadiq, Bilal, et al., "Throughput Optimality of Delay-driven Max Weight Scheduler for a Wireless System with Flow Dynamics," 47th Annual Allerton Conference, Sep. 30-Oct. 2, 2009, University of Illinois at Urbana-Champaign, Champaign, Illinois; 6 pages.

Salim, Umer, et al., "State-of-the-art of and promising candidates for PHY layer approaches on access and backhaul network," INFSO-ICT-317941 iJOIN D 2.1, iJOIN GA, Nov. 4, 2013; 129 pages.

Seo, H., et al., "A proportional-fair power allocation scheme for fair and efficient multiuser OFDM systems," in Proc. of IEEE GLOBECOM, Dec. 2004, Dallas (USA).

Stefan Schwarz etal: "Low complexity approximate maximum throughput scheduling for LTE," 2010 44th ASILOMAR Conference on Signals, Systems and Computers, Nov. 7-10, 2010, XP031860825, DOI:10.1109/ACSSC.2010.5757800ISBN:978-1-4244-9722-5 p. 1563-p. 1565.

Stolyar A.L., et al., "Self-Organizing Dynamic Fractional Frequency Reuse for Best-Effort Traffic through Distributed Inter-Cell Coordination," IEEE INFOCOM 2009, Proceedings of 28th Conference on Computer Communications, Apr. 12, 2009, pp. 1287-1295, XP031468882, ISBN:978-1-4244-3512-8.

Tassiulas, L., et al., "Stability Properties of Constrained Queueing Systems and Scheduling Policies for Maximum Trhoughput in Multihop Radio Networks," Technical Research Report,CSHCN TR 92-3/ISR TR 92-129, Center for Satellite & Hybrid Communication Networks, A NASA Center for the Commercial Development of Space; University of Maryland Institute for Systems Research; Published in IEEE Transactions on Automatic Control, vol. 37, No. 12, Dec. 1992; 14 pages.

Tayal, Nitin, "All About PDCCH and CCE Allocation," Tayal's Way to Learn LTE, Tutorial Blog dated May 2013, 14 pages http://nitintayal-lte-tutorials.blogspot.com/2013/05/all-about-pdcch-and-cce-allocation.html.

Thapa, Chandra, et al., "Comparative Evaluation of Fractional Frequency Reuse (FFR) and Traditional Frequency Reuse in 3GPP-LTE Downlink," International Journal of Mobile Netework Communications & Telematics (IJMNCT) vol. 2, No. 4, Aug. 2012; 8 pages.

"Transmission Time Interval," from Wikipedia, the free encyclopedia, May 2, 2013.

"TR-069 CPE WAN Management Protocol, Issue: 1 Amendment 5, Issue Date: Nov. 2013, CWMP Version: 1.4," Broadband Forum Technical Report; 228 pages.

"TR-069 CPE WAN Management Protocol," Broadband Forum Technical Report, Issue: 1 Amendment 4, Issue Date: Jul. 2011, Protocol Version 1.3, © The Broadband Forum. All Rights Reserved; 190 pages.

"TR-196 Femto Access Point Service Data Model, Issue: 2, Issue Date: Nov. 2011," Broadband Forum Technical Report; 46 pages.

UKIPO Mar. 27, 2012 Search Report from GB Patent Application Serial No. GB1120462.5.

UKIPO Jan. 19, 2013 Search Report from GB Patent Application Serial No. GB1120462.5.

UKIPO Dec. 20, 2013 Search Report from GB Application Serial No. GB1312321.1, 6 pages.

Velasco, Julio C., et al., "MEF Microwave Technologies for Carrier Ethernet," Metro Ethernet Forum (MEF), 6033 W. Century Boulevard, Suite 1107, Los Angeles CA 90045 USA Jan. 2011; 23 pages.

Wanda, Alex, "UMTS UTRAN Block Error Rate (BLER) Measurements," Telecom Insights, Jan. 2011; 3 pages http://trends-in-telecoms.blogspot.com/2011/01/umts-utrans-block-error-rate-rate-bler.html.

Wang, Jiao, "Dynamic Centralized Interference Coordination in Femto Cell Network with QoS Provision," Latest Trends on Communications, Proceedings of the 18th International Conference on Communications (Part of CSCC '14), Jul. 17-21, 2014; 6 pages.

Weaver, Carl, "Self-Organizing Mobility Robustness Optimization in LTE Networks with eICIC," Draft V5.0, Submitted Oct. 23, 2013, Cornell University Library, 19 pages http://arxiv.org/abs/1310.6173.

"Whats is Uplink RSSI in LTE," TelecomSource thread, May 22, 2013; 5 pages http://www.telecomsource.net/howthread.php?5464-Whats-is-Uplink-RSSI-in-LTE.

Wubben, Dirk, et al., "Benefits and Impact of Cloud Computing on 5G Signal Processing," IEEE Signal Processing Magazine, Nov. 2014.

Xiong, Chao, "Enhanced ICIC for LTE-A HetNet," ZTE Corporation, LTE World Summit 2012, May 2012; 3 pages.

Zyren, Jim, "Overview of the 3GPP Long Term Evolution Physical Layer," White Paper, Freescale Semiconductor, Document No. 3GPPEVOLUTIONWP; Jul. 2007; 27 pages.

EPO Jul. 29, 2014 Extended Search Report from European Application Serial No. EP13195673, 12 pages.

EPO Aug. 12, 2014 Extended EPO Search Report and Opinion from European Application Serial No. 13195780.8.

EPO Nov. 19, 2015 Extended Search Report and Written Opinion from European Application EP13767700; 9 pages.

PCT Jul. 16, 2013 International Search Report and Written Opinion from International Application PCT/IL2013/050269, 3 pages.

PCT Oct. 1, 2014 International Preliminary Report on Patentability from International Application PCT/IL2013/050269, 4 pages.

PCT Mar. 17, 2014 International Search Report and Written Opinion from International Application Serial No. PCT/IL2013/000086, 12 pages.

PCT Jun. 16, 2014 International Search Report and Written Opinion of the International Searching Authority for International Application Serial No. PCT/IL2013/000085.

PCT—Feb. 13, 2013 International Search Report and Written Opinion from International Application PCT/GB2012/052511; 28 pages.

U.S. Appl. No. 14/845,995, filed Sep. 4, 2015, entitled "Method and System for Dynamic Allocation of Resources in a Cellular Network," Inventors: Vladimir Yanover, et al.

U.S. Appl. No. 14/479,343, filed Sep. 7, 2014, entitled "Operation of Base Station in a Cellular Communications Network," Inventor: Simon Burley.

U.S. Appl. No. 14/818,084, filed Aug. 4, 2015 entitled "Resource Adaptation for Frequency Domain Downlink Inter-Cell Interference Coordination," Inventors: Ritesh K. Madan et al.

U.S. Appl. No. 14/848,026, filed Sep. 8, 2015 entitled "Serving Noise/Macro Interference Limited User Equipment for Downlink Inter-Cell Interference Coordination," Inventors: Ritesh K. Madan et al.

U.S. Appl. No. 14/811,580, filed Jul. 28, 2015 entitled "Determining Fractional Frequency Reuse Power Levels for Downlink Transmissions," Inventor: Ritesh K. Madan.

U.S. Appl. No. 14/816,957, filed Aug. 3, 2015 entitled "Selecting Cells for Downlink Inter-Cell Interference Coordination," Inventors: Rohit U. Nabar et al.

U.S. Appl. No. 14/816,990, filed Aug. 3, 2015 entitled "User Equipment Power Level Selection for Downlink Transmissions," Inventors: Vikram Chandrasekhar et al.

U.S. Appl. No. 14/686,598, filed Apr. 14, 2015, entitled "System and Method for Providing Uplink Inter Cell Interference Coordination in a Network Environment," Inventors: Ritesh K. Madan, et al.

U.S. Appl. No. 14/691,260, filed Apr. 20, 2015, entitled "System and Method for Providing Uplink Inter Cell Interference Coordination in a Network Environment," Inventors: Ritesh K. Madan, et al.

U.S. Appl. No. 14/809,201, filed Jul. 25, 2015, entitled "System and Method to Facilitate Small Cell Uplink Power Control in a Network Environment," Inventors: Ritesh K. Madan, et al.

(56) References Cited

OTHER PUBLICATIONS

U.S. Appl. No. 14/833,519, filed Aug. 24, 2015, entitled "System and Method to Facilitate Small Cell Uplink Powercontrol in a Network Environment," Inventors: Ritesh K. Madan, et al.
U.S. Appl. No. 14/918,420, filed Oct. 20, 2015, entitled "System and Method for Frequency and Time Domain Downlink Inter-Cell Interference Coordination," Inventors: Ritesh K. Madan, et al.
U.S. Appl. No. 14/951,987, filed Nov. 25, 2015, entitled "System and Method for Frequency and Time Domain Downlink Inter-Cell Interference Coordination," Inventors: Ritesh K. Madan, et al.
U.S. Appl. No. 14/803,475, filed Jul. 20, 2015, entitled "System and Method for Decoupling Long Term Evolution Media Access Control Scheduling From Subframe Rate Procedures," Inventors: Oliver James Bull et al.
U.S. Appl. No. 14/852,210, filed Sep. 11, 2015, entitled "System and Method for Providing Dynamic Radio Access Network Orchestration," Inventors: Virginia Rosa de Sousa Teixeira, et al.
U.S. Appl. No. 14/961,552, filed Dec. 7, 2015, entitled "System and Method to Provide Uplink Interference Coordination in a Network Environment," Inventor: Ritesh K. Madan.
"ETSI TS 123 402 V9.8.0 (Mar. 2011) Technical Specification: Universal Mobile Telecommunications System (UMTS); LTE; Architecture enhancements for non-3GPP accesses (3GPP TS 23.402 version 9.8.0 Release 9)," ETSI, 650 Route des Lucioles, F-06921, Sophia Antipolis Cedex—France, Mar. 2011; See Section 4-6, pp. 14-116.
"ETSI TS-125-469 V11.2.0 (Apr. 2013) Technical Specification: Universal Mobile Telecommunications System (UMTS); UTRAN Iuh interface Home Node B (HNB) Application Part (HNBAP) signaling (3GPP TS 25.469 version 11.2.0 Release 11)," © European Telecommunications Standards Institute 2013; Apr. 2013; 78 pages.
3GPP TSG-RAN WG3 Meeting #73bis R3-112481, "Issues Related to Cell RACH Support for HNB Handover," Alcatel-Lucent, 3GPP Draft, Zhuhai, China, Oct. 10-14, 2011; 10 pages.
3GPP TSG-RAN3 Meeting #69 R3-102094, "Text Proposal for HNBRAP," Alcatel-Lucent, 3GPP Draft, Madrid, Spain, Aug. 23-27, 2010; 62 pages.
Almeida, Erika, et al., "Enabling LTE/Wifi Coexistence by LTE Blank Subframe Allocation," 2013 IEEE International Conference on Communications (ICC), Jun. 9, 2013, pp. 5083-5088.
Author Unknown, Legacy UE Macro to HNB Active Hand-in, 3GPP TSG RAN WG3 Document No. R3-112600, Oct. 14, 2011, pp. 1-4.
Author Unknown, Submission to 3GPP TSG-RAN WG2 Meeting 66 bis, Document No. 62-093921; Jul. 3, 2009, pp. 1-2.
Ratasuk, Rapeepat, et al., "License-exempt LTE Deployment in Heterogeneous Network," 2012 International Symposium on Wireless Communications Systems (ISWCS), Aug. 28, 2012, pp. 246-250.
"3GPP TS 23.401 V13.5.0 (Dec. 2015) Technical Specification: $3^{rd}$ Generation Partnership Project; Technical Specification Group Services and System Aspects; General Packet Radio Service (GPRS) enhancements for Evolved Universal Terrestrial Radio Access Network (E-UTRAN) access (Release 13)," 3GPP, 650 Route des Lucioles, F-06921, Sophia Antipolis Cedex—France, Dec. 2015; 337 pages.
"802.11 Association Process Explained," Cisco Meraki, Article ID 2110; First published on or about Sep. 19, 2015; 3 pages https://documentation.meraki.com/MR/WiFi_Basics_and_Best_Practices/802.11_Association_process_explained.
Boccardi, Federico, et al., "Power Savings in Small Cell Deployments via Sleep Mode Techniques," Jan. 2010, 6 pages http://www.researchgate.net/publication/251976899.
Cai, Shijie, et al., "Power-Saving Heterogeneous Networks through Optimal Small-Cell Scheduling," GlobalSIP 2014: Energy Efficiency and Energy Harvesting Related Signal Processing and Communications, Dec. 3-5, 2014; 5 pages.
"Cisco Aironet 3700 Series Access Points," Data Sheet, Cisco Systems, Inc., C78-729421-04, Sep. 2014; 10 pages.
"Cisco Mobility IQ," Cisco Systems, C45-733657-00, Feb. 2015; 2 pages.
"Cisco Mobility Services Engine (up to Release 8.0 Software) Data Sheet," Cisco Systems, Published on or about Sep. 15, 2015; 9 pages http://www.cisco.com/c/en/us/products/collateral/wireless/mobility-services-engine/data_sheet_c78-475378.html.
"Cisco Mobility Services Engine," Products and Services, Cisco Systems, First published on or about Feb. 23, 2014; 3 pages http://www.cisco.com/c/en/us/products/wireless/mobility-services-engine/index.html.
"Electric power," from Wikipedia, the free encyclopedia, Jan. 15, 2016; 6 pages.
"Electrical energy," from Wikipedia, the free encyclopedia, Jan. 20, 2016; 2 pages.
"Energy vs. Power, Difference and Comparison," Diffen.com, First published on or about Jul. 26, 2011; 3 pages.
"ETSI TS 125 467 V12.3.0 (Jan. 2015) Technical Specification: Universal Mobile Telecommunications System (UMTS); UTRAN architecture for 3G Home Node B (HNB); Stage 2 (3GPP TS 25.467 version 12.3.0 Release 12)," European Telecommunications Standards Institute, 650 Route des Lucioles, F-06921 Sophia Antipolis Cedex, France, Jan. 2015; 93 pages.
"ETSI TS 132 593 V12.0.0 (Oct. 2014) Technical Specification: LTE; Telecommunication management; Home enhanced Node B (HeNB) Operations, Administration, Maintenance and Provisioning (OAM &P); Procedure flows for Type 1 interface HeNB to HeNB Management System (HeMS) (3GPP TS 32.593 version 12.0.0 Release 12)," European Telecommunications Standards Institute, 650 Route des Lucioles, F-06921 Sophia Antipolis Cedex, France, Oct. 2014; 21 pages.
"IEEE Std 802.11-2012 (Revision of IEEE Std 802.11-2007: Part 11: Wireless LAN Medium Access Control (MAC) and Physical Layer (PHY) Specifications IEEE Standard for Information technology—Telecommunications and information exchange between systems; Local and metropolitan area networks, Specific Requirements," IEEE Standards Association, IEEE Computer Society, Mar. 29, 2012; Relevant sections: 3, 4.10, and 8.3.3.6 only.
Lewis, Rob, "The Great 'Power vs. Energy' Confusion," CleanTechnica, Feb. 2, 2015; 17 pages http://cleantechnica.com/2015/02/02/power-vs-energy-explanation.
U.S. Appl. No. 14/822,195, filed Aug. 10, 2015, entitled "System and Method for Hand-In Disambiguation Using User Equipment Wifi Location in a Network Environment," Inventor(s): Anton Okmyanskiy, et al.
U.S. Appl. No. 15/051,387, filed Feb. 23, 2016, entitled "System and Method to Provide Power Management for a Multimode Access Point in a Network Environment," Inventor(s): Santosh Ramrao Patil, et al.
"3GPP TS 22.368 V13.0.0 (Jun. 2014) Technical Specification: 3rd Generation Partnership Project; Technical Specification Group Services and System Aspects; Service requirements for Machine-Type Communications (MTC); Stage 1 (Release 13)," 3rd Generation Partnership Project; Jun. 2014.
"3GPP TS 23.060 V13.0.0 (Sep. 2014) Technical Specification: 3rd Generation Partnership Project; Technical Specification Group Services and System Aspects; General Packet Radio Service (GPRS); Service description; Stage 2 (Release 13)," [Relevant Sections 5.3.20 and 6.2.3 only]; 3rd Generation Partnership Project; Sep. 2014.
"3GPP TS 23.682 V12.2.0 (Jun. 2014) Technical Specification: 3rd Generation Partnership Project; Technical Specification Group Services and System Aspects; Architecture enhancements to facilitate communications with packet data networks and applications (Release 12)," 3rd Generation Partnership Project; Jun. 2014.
"3GPP TS 23.887 V12.0.0 (Dec. 2013) Technical Report: 3rd Generation Partnership Project; Technical Specification Group Services and System Aspects; Study on Machine-Type Communications (MTC) and other mobile data applications communications enhancements (Release 12)," 3rd Generation Partnership Project; Dec. 2013.
"3GPP TS 23-203 V13.1.0 (Sep. 2014) Technical Specification: 3rd Generation Partnership Project; Technical Specification Group Services and System Aspects; Policy and charging control architecture (Release 13)," [Relevant Sections 1-6 only]; 3rd Generation Partnership Project, Sep. 2014.
"3GPP TS 29-272 V12-6-0 (Sep. 2014) Technical Specification: 3rd Generation Partnership Project; Technical Specification Group Core Network and Terminals; Evolved Packet System (EPS); Mobility Management Entity (MME) and Serving GPRS Support Node

(56) References Cited

OTHER PUBLICATIONS (SGSN) related interfaces based on Diameter protocol (Release12)," [Relevant Sections 5 and 7.3.1-7.3.21 only]; 3rd Generation Partnership Project; Sep. 2014.

"3GPP TS 29-274 V12-6-0 (Sep. 2014) Technical Specification: 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," [Relevant Sections 4-6; 7.1-7.2.15; and 8.1-8.21.6 only]; 3rd Generation Partnership Project; Sep. 2014.

"3GPP TS 36.300 V12.3.0 (Sep. 2014) Technical Specification: 3rd Generation Partnership Project; Technical Specification Group Radio Access Network; Evolved Universal Terrestrial Radio Access (E-UTRA) and Evolved Universal Terrestrial Radio Access Network 9E-UTRAN); Overall description; Stage 2 (Release 12)," [Relevant Sections 15 and 23 only]; 3rd Generation Partnership Project; Sep. 2014.

"3GPP TS 36.413 V12.3.0 (Sep. 2014) Technical Specification: 3rd Generation Partnership Project; Technical Specification Group Radio Access Network; Evolved Universal Terrestrial Radio Access Network (E-UTRAN); S1 Application Protocol (S1AP) (Release 12)," [Relevant Sections 9.1.6 and 9.2.3.13 only]; 3rd Generation Partnership Project, Sep. 2014.

"ETSI TS 123 007 V12.6.0 (Oct. 2014) Technical Specification: Digital Cellular Telecommunications System (Phase 2+); Universal Mobile Telecommunications System (UMTS); LTE; Restoration procedures (EGPP TS 23.007 version 12.6.0 Release 12)," ETSI, 650 Route des Lucioles, F-06921, Sophia Antipolis Cedex—France, Oct. 2014; 93 pages.

"ETSI TS 123 401 V11.10.0 (Jul. 2014) Technical Specification: LTE; General Packet Radio Service (GPRS) enhancements for Evolved Universal Terrestrial Radio Access Network (E-UTRAN) access (3GPP TS 23.401 version 11.10.0 Release 11)," [Relevant Sections 5.3.1.2 and 5.3.4.3 only]; ETSI, 650 Route des Lucioles, F-06921, Sophia Antipolis Cedex—France, Jul. 2014.

"ETSI TS 123 401 V12.6.0 (Sep. 2014) Technical Specification: LTE; General Packet Radio Service (GPRS) enhancements for Evolved Universal Terrestrial Radio Access Network (E-UTRAN) access (3GPP TS 23.401 version 12.6.0 Release 12)," ETSI, 650 Route des Lucioles, F-06921, Sophia Antipolis Cedex—France, Sep. 2014; 308 pages.

"Etsi TS 125 211 V11.5.0 (Jul. 2014) Technical Specification: Universal Mobile Telecommunications System (UMTS); Physical channels and mapping of transport channels onto physical channels (FDD) (3GPP TS 25.211 version 11.5.0 Release 11)," [Relevant Section 7 only]; ETSI, 650 Route des Lucioles, F-06921, Sophia Antipolis Cedex—France, Jul. 2014.

"ETSI TS 129 061 V12.7.0 (Oct. 2014) Technical Specification: Digital cellular telecommunications system (Phase 2+); Universal Mobile Telecommunications System (UMTS); LTE; Interworking between the Public Land Mobile Network (PLMN) supporting packet based services and Packet Data Networks (PDN) (3GPP TS 29.061 version 12.7.0 Release 12)," ETSI, 650 Route des Lucioles, F-06921, Sophia Antipolis Cedex—France, Oct. 2014; 170 pages.

\* cited by examiner

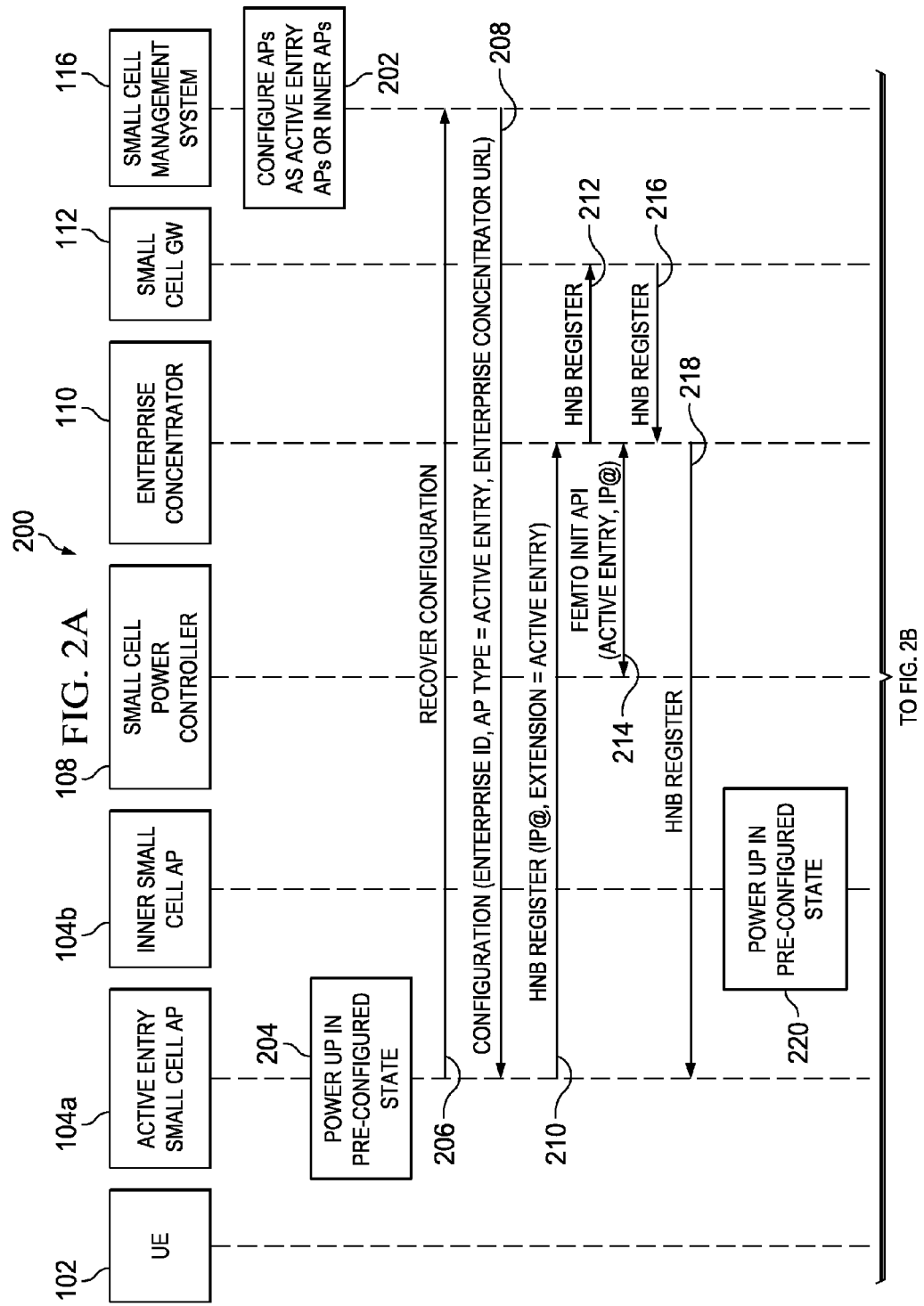

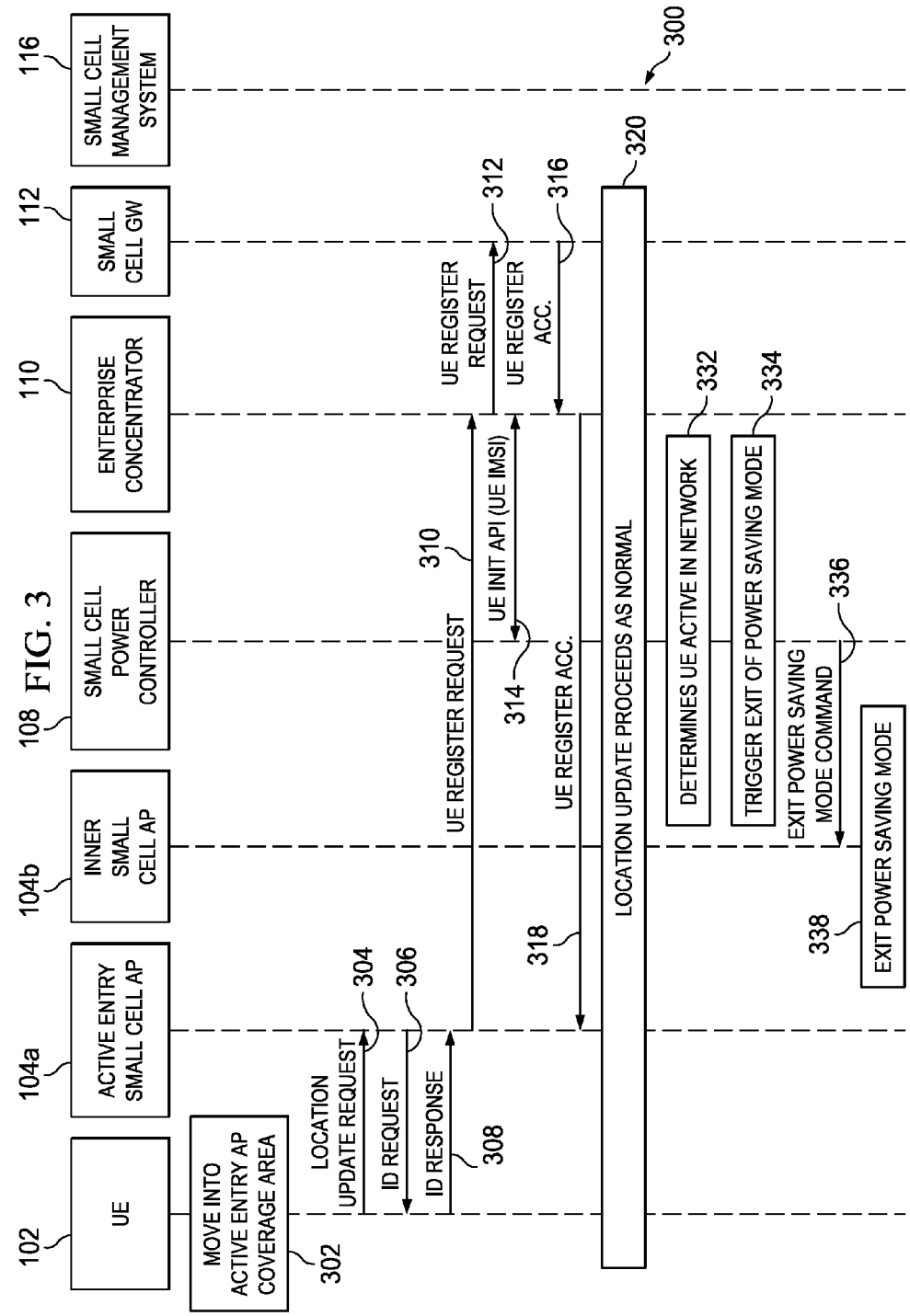

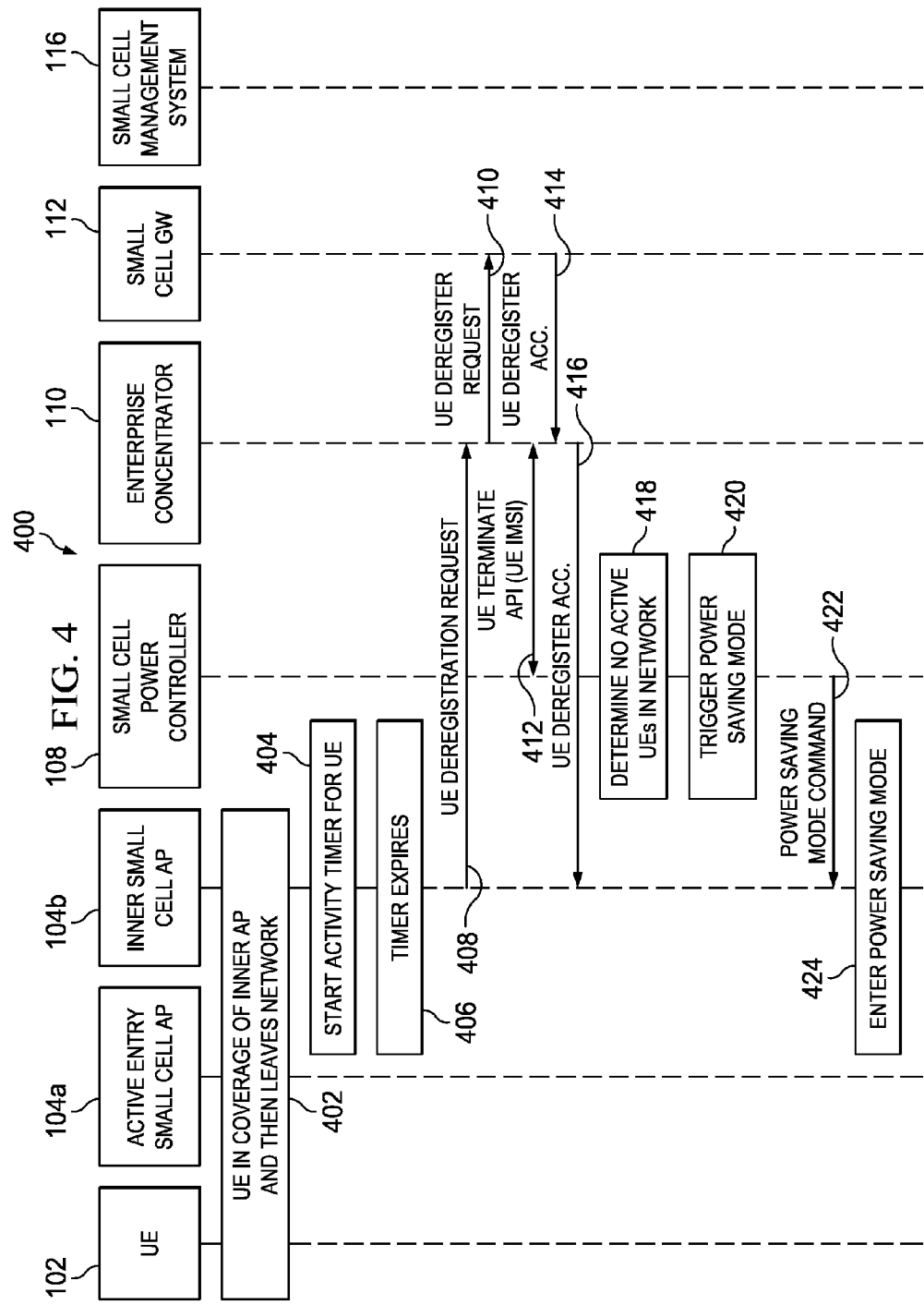

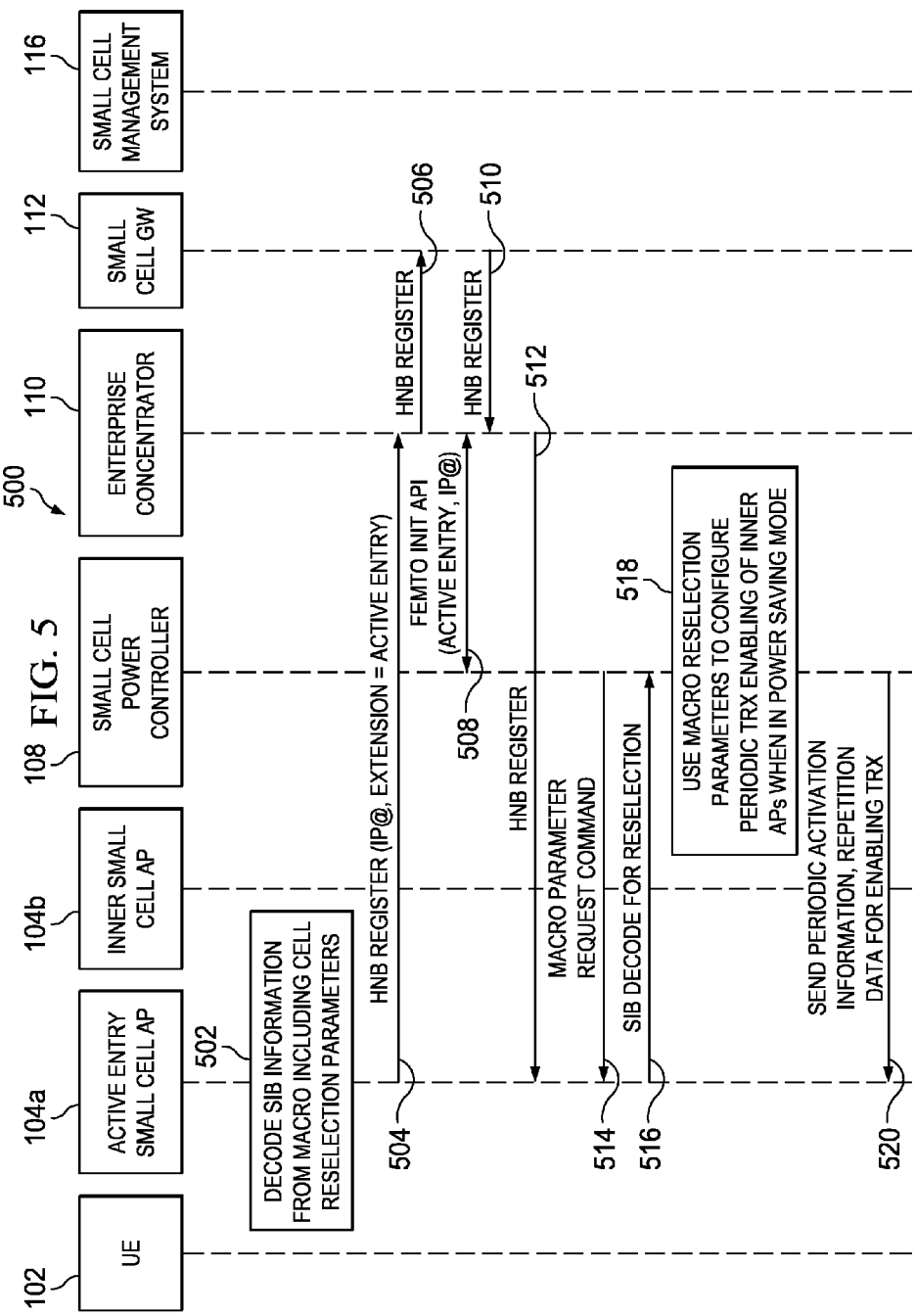

US 9,414,310 B2

SYSTEM AND METHOD FOR SMALL CELL POWER CONTROL IN AN ENTERPRISE NETWORK ENVIRONMENT

TECHNICAL FIELD

This disclosure relates in general to the field of communications and, more particularly, to a system and method for small cell power control in an enterprise network environment.

BACKGROUND

Networking architectures have grown increasingly complex in communication environments. For example, femtocells have gained recent notoriety due to their capabilities, and because of their ease-of-use. In general terms, access points can operate in licensed spectrum to connect wireless devices to the network (e.g., using broadband connections). For a mobile operator, the access points can offer improvements to both coverage and capacity: particularly applicable to indoor environments. An increasing emphasis exists on reducing power consumption within enterprise environments. However, femtocell access points within an enterprise environment may consume power even when there are no users within the enterprise environment.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which:

FIGS. 2A-2B are a simplified flow diagram depicting a flow associated with initialization of small cell for power control in the enterprise environment according to one embodiment;

FIG. 3 is a simplified flow diagram depicting a flow associated with a user equipment device moving into coverage of the enterprise environment according to one embodiment;

FIG. 4 is a simplified flow diagram depicting a flow associated with a user equipment device moving out of coverage of the enterprise environment according to one embodiment;

FIG. 5 is a simplified flow diagram depicting a flow associated with configuration of inner small cell access point detection of user equipment device within the enterprise environment according to one embodiment;

DETAILED DESCRIPTION OF EXAMPLE EMBODIMENTS

Overview

A method is provided in one embodiment and includes receiving a first message including an indication that a first access point of a first network is a gateway access point of a first network, receiving a second message including an indication that a second access point of the first network is an inner access point of the first network, and receiving an indication of a number of wireless devices registered with at least one of the first access point and the second access point. The method further includes determining a power mode for the second access point based upon whether at least one wireless device is registered with the first access point or the second access point, and sending a power mode command message to the second access point indicative of the determined power mode.

In specific embodiments, the first message further includes a first network address associated with the first access point. In other specific embodiments, the second message further includes a second network address associated with the second access point. In other specific embodiments, the first network is a small cell network. In still other specific embodiments, the first access point is active entry small cell access point. In other specific embodiments, the indication includes an identifier associated with a particular wireless device.

In specific embodiments, the method further includes, when there is not at least one wireless device registered with the first access point or the second access point, determining that the power mode for the second access point is a reduced power consumption mode for the second access point. In other specific embodiments, the method further includes, when there is at least one wireless device registered with the first access point or the second access point, determining that the power mode for the second access point is an active power consumption mode for the second access point.

In other specific embodiments, the method further includes sending periodic activation information to the second access point, the periodic activation information indicating a determined repetition period for a periodic enabling of a transmitter of the second access point when in a reduced power consumption mode.

In still other specific embodiments, the method further includes sending a request for reselection parameters associated with a second network to the first access point, receiving the reselection parameters from the first access point, and determining the determined repetition period based upon the reselection parameters. In still other specific embodiments, the second network is a macro network.

Example Embodiments

Figure 1:
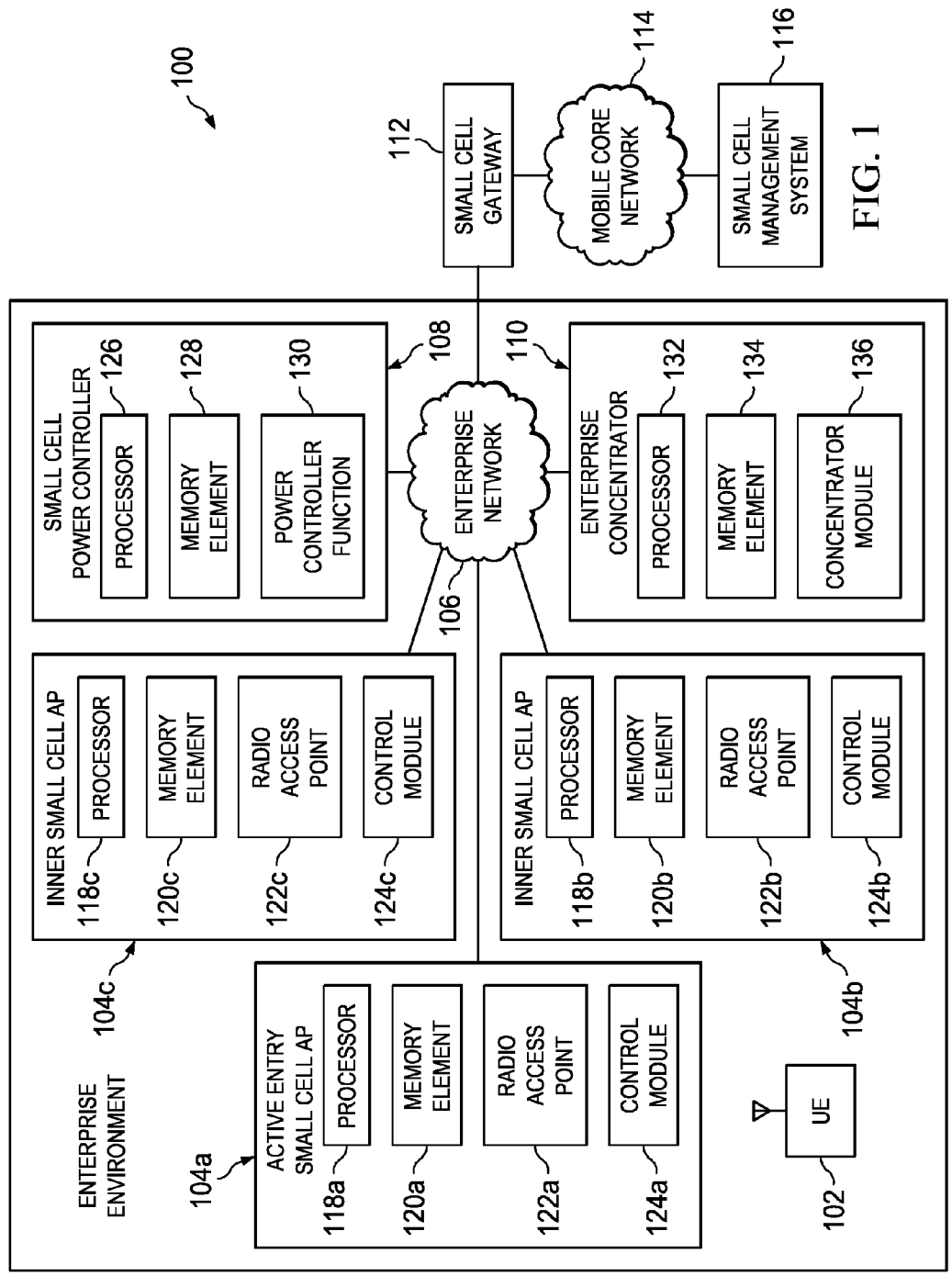
FIG. 1 is a simplified block diagram of a communication system 100 for performing small cell power control in an enterprise network environment in accordance with one embodiment of the present disclosure.

Turning to FIG. 1, FIG. 1 is a simplified block diagram of a communication system 100 for performing small cell power control in an enterprise network environment in accordance with one embodiment of the present disclosure. FIG. 1 includes user equipment 102, an active entry small cell access point (AP) 104a, a first inner small cell access point (AP) 104b, a second inner small cell access point (AP) 104c, an enterprise network 106, a small cell power controller 108, an enterprise concentrator 110, a small cell gateway 112, a mobile core network 114, and a small cell management system 116.

In the embodiment illustrated in FIG. 1, user equipment 102, active entry small cell AP 104a, first inner small cell AP 104b, second inner small cell AP 104c, enterprise network 106, small cell power controller 108, and enterprise concentrator 110 are located in an enterprise environment, and small cell gateway 112, mobile core network 114, and small cell management system 116 are located within a service provider network. In a particular embodiment, active entry small cell AP 104a is located within an entry area of an enterprise environment, such as an entry lobby of a build associated with an enterprise, and one or more of first inner small cell AP 104b and second inner small cell AP 104c are located in an area of the enterprise environment beyond the entry area. In particular embodiments, active entry small cell AP 104a, first inner small cell AP 104*b*, and second inner small cell AP 104*c* are femtocell access points. In still another particular embodiment, active entry small cell AP 104*a*, first inner small cell AP 104*b*, and second inner small cell AP 104*c* are Home Node B (HNB) femtocells providing 3G radio coverage within the enterprise environment.

Active entry small cell AP 104*a*, first inner small cell AP 104*b*, second inner small cell AP 104*c*, small cell power controller 108, and enterprise concentrator 110 are in communication with enterprise network 106. Enterprise network 106 is in further communication with small cell gateway 112, and small cell gateway 112 is in further communication with mobile core network 114. Small cell management system 116 is in communication with mobile core network 114. User equipment 102 is configured to include a cellular radio capable of communicating with small cell access points located within a small cell environment as well as macro cells located within an service provider network. User equipment 102 can be associated with clients or customers wishing to initiate a communication in communication system 100 via some network. The term 'user equipment' is interchangeable with the terminology 'endpoint' and 'wireless device', where such terms are inclusive of devices used to initiate a communication, such as a computer, a personal digital assistant (PDA), a laptop or electronic notebook, a cellular telephone, an i-Phone, an i-Pad, a Google Droid, an IP phone, or any other device, component, element, or object capable of initiating voice, audio, video, media, or data exchanges within communication system 100.

User equipment 102 may also be inclusive of a suitable interface to the human user, such as a microphone, a display, a keyboard, or other terminal equipment. User equipment 102 may also be any device that seeks to initiate a communication on behalf of another entity or element, such as a program, a database, or any other component, device, element, or object capable of initiating an exchange within communication system 100. Data, as used herein in this document, refers to any type of numeric, voice, video, or script data, or any type of source or object code, or any other suitable information in any appropriate format that may be communicated from one point to another.

Active entry small cell AP 104*a* includes a processor 118*a*, a memory element 120*a*, a radio access point 122*a*, and a control module 124*a*. Processor 118*a* is configured to execute various tasks of active entry small cell AP 104*a* as described herein and memory element 120*a* is configured to store data associated with active entry small cell AP 104*a*. Radio access point 122*a* is configured to communicate using a radio connection, such as a 3G or 4G connection, with user equipment 102. Control module 124*a* is configured to perform various power control functions of active entry small cell AP 104*a* as described herein.

First inner small cell AP 104*b* includes a processor 118*b*, a memory element 120*b*, a radio access point 122*b*, and a control module 124*b*. Processor 118*b* is configured to execute various tasks of first inner small cell AP 104*b* as described herein and memory element 120*b* is configured to store data associated with first inner small cell AP 104*b*. Radio access point 122*b* is configured to communicate using a radio connection, such as a 3G or 4G connection, with user equipment 102. Control module 124*b* is configured to perform various power control functions of first inner small cell AP 104*b* as described herein. Second inner small cell AP 104*c* includes a processor 118*c*, a memory element 120*c*, a radio access point 122*c*, and a control module 124*c*. Processor 118*c* is configured to execute various tasks of second inner small cell AP 104*c* as described herein and memory element 120*c* is configured to store data associated with second inner small cell AP 104*c*. Radio access point 122*c* is configured to communicate using a radio connection, such as a 3G or 4G connection, with user equipment 102. Control module 124*c* is configured to perform various power control functions of second inner small cell AP 104*c* as described herein.

In general terms, access points 104*a*-104*c* represent access point devices that can allow wireless devices to connect to a wired network using Wi-Fi, Bluetooth, WiMAX, UMTS, or any other appropriate standard. Hence, the broad term 'access point' is inclusive of a wireless access point (WAP), a femtocell, a hotspot, a picocell, a small cell, a WiFi array, a wireless bridge (e.g., between networks sharing same Service Set Identifier (SSID) and radio channel), a wireless local area network (LAN), or any other suitable access device, which may be capable of providing suitable connectivity to a wireless device. In certain cases, the access point connects to a router (via a wired network), and it can relay data between the wireless devices and wired devices of the network.

Small cell power controller 108 includes processor 126, memory element 128, and power control function 130. Processor 126 is configured to execute various tasks of small cell power controller 108 as described herein and memory element 128 is configured to store data associated with small cell power controller 108. Power control function 130 is configured to perform the various operations of small cell power controller 108 including small cell power control operations as described herein. Enterprise concentrator 110 includes processor 132, memory element 134, and concentrator module 136. Processor 132 is configured to execute various tasks of enterprise concentrator 110 as described herein and memory element 134 is configured to store data associated with enterprise concentrator 110. Concentrator module 136 is configured to perform the various small cell enterprise concentration operations as described herein. In accordance with various embodiments, one or more of small cell power controller 108 and enterprise concentrator 110 may be located within separate network elements, integrated into a single network element, or integrated with active entry small cell AP 104*a*, first inner small cell AP 104*b*, or second inner small cell AP 104*c*.

Note that before detailing some of the operational aspects of FIG. 1, it is important to understand common characteristics of radio access points, femtocells, etc. as they generally operate in commercial architectures. The following foundational information is offered earnestly for purposes of teaching and example only and, therefore, should not be construed in any way to limit the broad teachings of the present disclosure. In many architectures, femtocells can be deployed as autonomous units to improve reception in areas with poor coverage, or within buildings where coverage is reduced by the structure itself. Wireless devices that are attached to (and in communication with) femtocells can have their data transmissions routed to the service provider's network (e.g., over the internet, over any suitable network, etc.). Thus, the access point (e.g., the femtocell) operates as a mini tower for the proximate user. However, the coverage provided by the access point is generally open to anyone within range: unless configurations operate to limit access to the network to only those individuals duly authorized for access.

Essentially, femtocells are fully featured (but low-power) wireless device base stations. Femtocells can be connected using standard broadband digital subscriber line (DSL), cable service, or Enterprise Network into the service provider's network. Femtocells offer excellent wireless device coverage at home for voice, data, etc., but at a lower cost than an arbitrary outdoor service. In operation, when in range of the femtocell (e.g., in a residential environment), a wireless device can automatically detect the femtocell, and subsequently use it (as a preference over outdoor cell sites). Calls can be made and received, where the signals are sent (potentially encrypted) from the femtocell via the broadband IP network to one of the mobile operator's main switching centers. Typically, femtocells operate at low radio power levels (e.g., less than cordless phones, WiFi, or many other household equipment). This can substantially increase battery life for wireless devices: both on standby and talk time. Additionally, because wireless devices are much closer to the femtocell, call quality is excellent and data devices can operate at full speed. Larger femtocell designs intended for business use (i.e., enterprise) can readily handle 8, 16, 32, etc. concurrent calls.

In enterprise small cell environments, "portal" or "gateway" cells, such as active entry small cell AP 104a, are typically used to transition users as they hand over from a macro network to a small cell network. In a particular embodiment, the small cell network is an HNB network. These "portal" cells are typically configured in the macro network to facilitate macro-to-HNB handover. In a particular example operation, a user associated with user equipment 102 enters the enterprise environment and user equipment 102 handovers from the macro network of the service provider to active entry small cell AP 104a. In a particular example, active entry small cell AP 104a is located in or nearby a lobby area of a building of the enterprise. The user may then handover to an inner access point such as first inner access AP 104b or second inner small cell AP 104c.

In accordance with various embodiments, first inner small cell AP 104b and second inner small cell AP 104c may be maintained in a power saving state until user equipment 102 is detected as active by active entry small cell AP 104a. Upon detection of user equipment 102 being active on active entry small cell AP 104a, first inner small cell AP 104b and second inner small cell AP 104c may be instructed to leave the power saving state and be ready to handover to user equipment 102 as it moves around the enterprise environment.

In the embodiment illustrated in FIG. 1, enterprise concentrator 110 includes a counting function to keep track of the number of users that are active on small cells in the enterprise environment and provides this information to small cell power controller 108. Upon receiving an indication from enterprise concentrator 110 that there are no active users within the small cell network, small cell power controller 108 may be configured to trigger first inner small cell AP 104b and second inner small cell 104c to enter a power saving state. Upon receiving an indication from enterprise concentrator 110 that there is at least one active user within the small cell network, small cell power controller 108 may be configured to trigger first inner small cell AP 104b and second inner small cell 104c to exit the power saving state and remain reader for handover with user equipment 102.

In particular embodiments, small cell APs 104a-104c are operable to signal the number of attached UEs on the network to enterprise concentrator 110 and enterprise concentrator 110 may signal this information to small cell power controller 108. In one embodiment, Home Node B Application Part (HNBAP) protocol UE Registration signaling is used to provide such capability. Small cell power controller 108 is then operable to signal all inner small cell APs, such as first inner small cell AP 104b and second inner small cell AP 104c to enter a energy saving state when no UEs are attached to the network. Such a signal is used by the inner small cell to switch into a power saving mode, e.g., by reducing its Common Pilot Channel (CPICH) power or disabling its transmitter completely.

In at least one embodiment, active entry small cell AP 104a is operable to signal enterprise concentrator 110 with the number of UEs attached to or registered with active entry small cell AP 104a, and provide this information to small cell power controller 108. When small cell power controller 108 receives an indication that a new UE is attached to the network, small cell power controller 108 is operable to signal first inner small cell AP 104b and second inner small cell AP 104c that they should exit energy saving mode.

In another embodiment, communication system 100 may be augmented to be able to identify UEs not transitioning through active entry small cell AP 104a, e.g., if a user powers on user equipment 102 when the user is already in the middle of the HNB network. In such embodiments, first inner small cell AP 104b and second inner small cell AP 104c are operable when in energy saving mode to periodically enable their respective transmitters to broadcast information with a unique local area code (LAC) that will then trigger a Location Update from any UE in coverage of first inner small cell AP 104b or second inner small cell AP 104c. In particular embodiments, the periodicity of transmitter enablement can be configured according to cell reselection parameters configured on the macro network. For example, in one embodiment, active entry small cell AP 104a is responsible for signaling the enterprise concentrator 110 with SIB information recovered from the macro network. Small cell power controller 108 may then include such information when signaling first inner small cell AP 104b and second inner small cell AP 104c to enter an energy saving mode.

In still other embodiments, the periodic transmitter enablement across first inner small cell AP 104b and second inner small cell AP 104c is synchronized, e.g., to account for possible movement of a UE between neighboring small cells when they are in energy saving mode. HNBs typically already have a common time reference, e.g., using Network Time Protocol (NTP). In such embodiments, the signal to enter energy saving mode includes synchronization information that enables first inner small cell AP 104b and second inner small cell AP 104c to synchronize their periodic transmitter enablement.

Various signaling mechanisms and protocols may be used between the network elements of communication system 100 to enable the power saving functions described herein. Particular embodiments are further described with respect to FIGS. 2A-6 in which HNB signaling protocols are used to signal between small cell APs 104a-104c, small cell power controller 108, enterprise concentrator 110, small cell gateway 112, and/or small cell management system 116.

In one example implementation, small cell APs 104a-104c, small cell power controller 108, enterprise concentrator 110, small cell gateway 112, and/or small cell management system 116 are network elements that facilitate or otherwise help coordinate power control activities (e.g., for networks such as those illustrated in FIG. 1). As used herein in this Specification, the term 'network element' is meant to encompass network appliances, servers, routers, switches, gateways, bridges, loadbalancers, firewalls, processors, modules, base stations, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one example implementation, small cell APs 104a-104c, small cell power controller 108, enterprise concentrator 110, small cell gateway 112, and/or small cell management system 116 include software to achieve the power control operations, as outlined herein in this document. In other embodiments, this feature may be provided external to these elements, or included in some other network device to achieve this intended functionality. Alternatively, both elements include software (or reciprocating software) that can coordinate in order to achieve the operations, as outlined herein. In still other embodiments, one or both of these devices may include any suitable algorithms, hardware, software, components, modules, interfaces, or objects that facilitate the operations thereof.

Figure 2B:
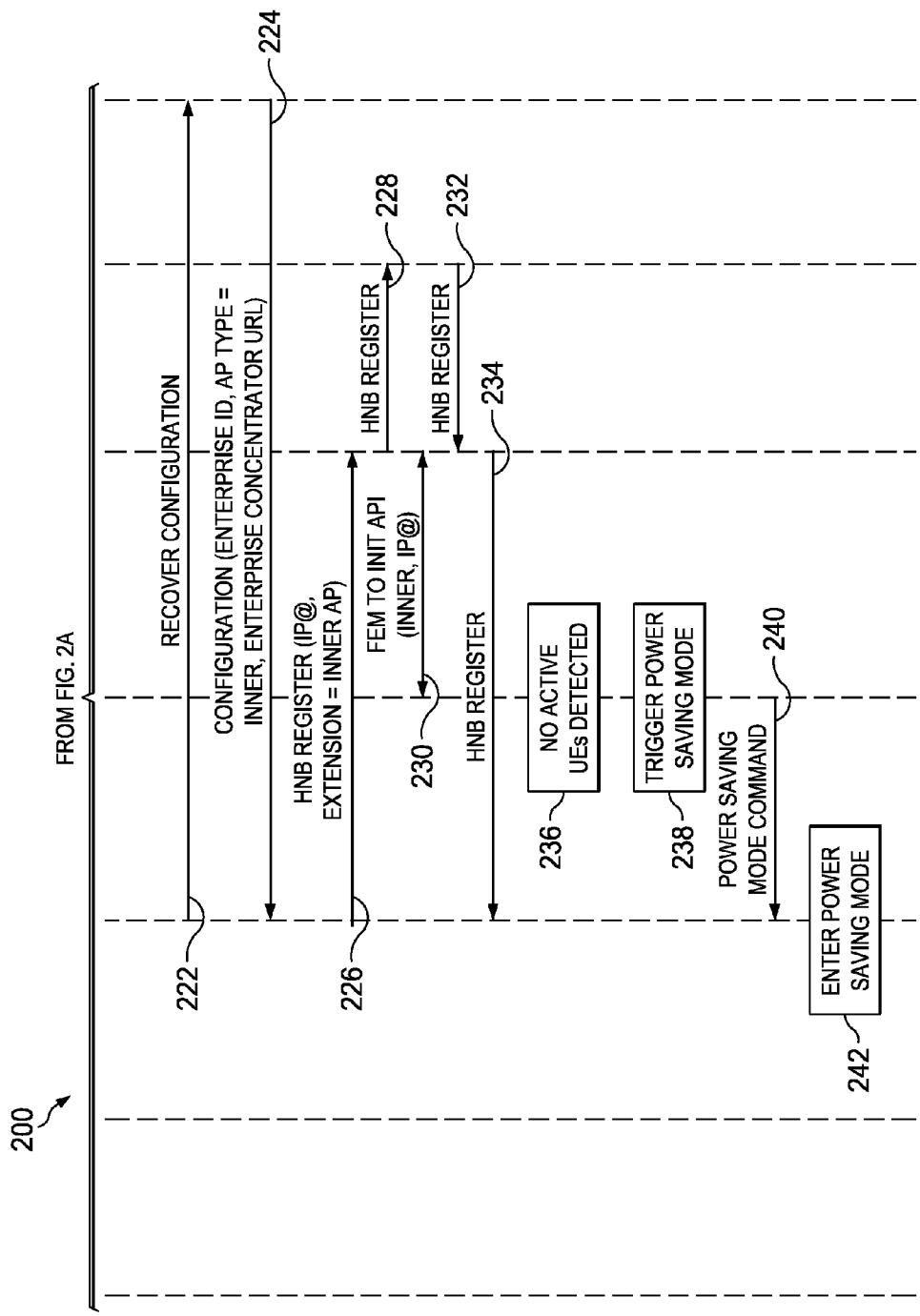

Referring now to FIGS. 2A-2B, FIGS. 2A-2B are a simplified flow diagram depicting a flow 200 associated with initialization of small cell for power control in the enterprise environment according to one embodiment. In this particular flow 200, the small cell APs of the enterprise environment are designated as either active entry small cell APs and inner APs and the power control operations of each is configured accordingly. For clarify of illustration, signaling for first inner small cell AP 104b is described. However, it should be understood that in one or more embodiments the same or similar signaling may be used with respect to second inner small cell AP 104c. In 202, small cell management system 116 configures the small cell APs of the enterprise environment as either active entry small cell APs or inner small cell APs. In the particular embodiment described herein, active entry small cell AP 104a is configured as an active entry small cell AP, and first inner small cell AP 104b, and second inner small cell AP 104c are configured as inner small cell APs.

In 204, active entry small cell AP 104a powers up in a pre-configured state including information preconfigured by small cell management system 116. In various embodiments, the pre-configured information includes a network address, such as a URL, associated with small cell management system 116. In 206, active entry small cell AP 104a sends a recover configuration message to small cell management system 116 indicating a request for small cell management system 116 to provide configuration information to active entry small cell AP 104a. In 208, small cell management system 116 sends configuration information to active entry small cell AP 104a. In accordance with one or more embodiments, the configuration includes an Enterprise ID associated with the enterprise network, an access point type designation indicating that the AP is to be designated as an active entry small cell AP (AP Type=active entry), and a network address of enterprise concentrator 110 (e.g., enterprise concentrator URL).

In 210, active entry small cell AP 104a sends a registration message to enterprise concentrator 110 including a network address of active entry small cell AP 104a and the AP type designation (active entry) of active entry small cell AP 104a. In a particular embodiment, the registration message is an HNB register message (such as described in 3GPP TS 25.469 version 11.2.0 Release 11) including an IP address of active entry small cell AP 104a and an extension indicating the role of active entry small cell AP 104a as an active entry small cell AP. In 212, enterprise concentrator 110 sends an HNB register message to small cell gateway 112 indicating that active entry small cell AP 104a has been registered in the small cell network.

In 214, a femto initiation API is used between enterprise concentrator 110 and small cell power controller 108 to allow enterprise concentrator 110 to provide the IP address of active entry small cell AP 104a and an indication to small cell power controller 108 that active entry small cell AP 104a has been initialized on the enterprise premises as an active entry small cell AP. In 216, small cell gateway 112 sends an HNB registration acknowledgement to enterprise concentrator 110. In 218, enterprise concentrator sends the HNB registration acknowledgment to active entry small cell AP 104a acknowledging the registration with small cell gateway 112.

In 220, inner small cell AP 104b powers up in a pre-configured state including information preconfigured by small cell management system 116. In various embodiments, the pre-configured information includes a network address, such as a URL, associated with small cell management system 116. In 222, inner small cell AP 104b sends a recover configuration message to small cell management system 116 indicating a request for small cell management system 116 to provide configuration information to inner small cell AP 104b. In 224, small cell management system 116 sends configuration information to inner small cell AP 104b. In accordance with one or more embodiments, the configuration includes an Enterprise ID associated with the enterprise network, an access point type designation indicating that the AP is to be designated as an inner small cell AP (AP Type=inner), and a network address of enterprise concentrator 110 (e.g., enterprise concentrator URL).

In 226, inner small cell AP 104b sends a registration message to enterprise concentrator 110 including a network address of inner small cell AP 104b and the AP type designation (inner AP) of inner small cell AP 104b. In a particular embodiment, the registration message is an HNB register message including an IP address of inner small cell AP 104b and an extension indicating the role of inner small cell AP 104b as an inner small cell AP. In 228, enterprise concentrator 110 sends an HNB register message to small cell gateway 112 indicating that inner small cell AP 104b has been registered in the small cell network.

In 230, the femto initiation API is used between enterprise concentrator 110 and small cell power controller 108 to allow enterprise concentrator 110 to provide the IP address of inner small cell AP 104b and an indication to small cell power controller 108 that inner small cell AP 104b has been initialized on the enterprise premises as an inner small cell AP. In 232, small cell gateway 112 sends an HNB registration acknowledgement to enterprise concentrator 110. In 234, enterprise concentrator sends the HNB registration acknowledgment to inner small cell AP 104b acknowledging the registration with small cell gateway 112.

In 236, small cell power controller determines that there are no active user equipment (UE) devices within the network based upon not receiving an indication of such from enterprise concentrator 110. In 238, small cell power controller 108 triggers the power saving mode for inner small cell APs. In 240, small cell power controller 108 sends a power saving mode command to inner small cell AP 104b indicating for inner small cell AP 104b to enter a power saving mode. In 242, inner small cell AP enters the power saving mode and the flow ends. In accordance with various embodiments, the power saving mode may include inner small cell AP 104b lowering the power consumption of one or more components of inner small cell AP 104b such as reducing CPICH power or disabling its transmitter completely. It should be understood that in various embodiments, active entry small cell AP 104a remains in an active state in order to detect a user equipment device when it enters the enterprise environment.

FIG. 3 is a simplified flow diagram depicting a flow 300 associated with a user equipment device moving into coverage of the enterprise environment according to one embodiment. In 302, user equipment (UE) 102 moves into the coverage area of active entry small cell AP 104a. In a particular embodiment, user equipment 102 may enter a lobby of a building includes in active entry small cell AP 104a. In 304, user equipment 102 sends a location update request to active entry small cell AP 104a. In 306, active entry small cell AP 104a sends an identity (ID) request to user equipment 102. In 308, user equipment 102 sends an ID response to active entry small cell AP 104a including an identifier associated with user equipment 102. In a particular embodiment, the identifier includes the International Mobile Subscriber Identity (IMSI) of user equipment 102.

In 310, active entry small cell AP 104a sends a UE register request including the IMSI to enterprise concentrator 110 requesting registration of user equipment 102. In 312, enterprise concentrator 110 relays the UE register request to small cell gateway 112. In 314, a UE initialization API is used between enterprise concentrator 110 and small cell power controller 108 to allow enterprise concentrator 110 to provide an indication to small cell power controller 108 that a user equipment device has been initialized on the small cell network. In a particular embodiment, enterprise concentrator 110 further provides the IMSI of user equipment 102 to small cell power controller 108. In 316, small cell gateway 112 sends an UE register acceptance message to enterprise concentrator 110 acknowledging that user equipment 102 has been registered with small cell gateway 112. In 318, enterprise concentrator 110 relays the UE register acceptance message to active entry small cell AP 104a. In 320, standard location update procedures proceed as normal.

In 332, small cell power controller 108 determines that there is an active user equipment device, i.e. user equipment 102, within the small cell network based upon the indication received from enterprise concentrator 110. Since small cell power controller 108 knows that there is at least one active UE in the small cell network and it is anticipated that the UE will move within the enterprise environment to an area covered by an inner small cell, small cell controller may instruct the inner small cells to leave their power saving state. Accordingly, in 334, small cell power controller triggers exit of the power saving mode for the inner small cell APs. In 336, small cell power controller 108 sends an exit power saving move command to first inner small cell AP 104b indicating that first inner small cell AP 104b is to exit the power saving mode. In 338, first inner small cell AP 104b exits the power saving mode and the flow ends. User equipment 102 may then handover from active entry small cell AP 104a to first inner small cell AP 104b if user equipment 102 enters a coverage area of first inner small cell AP 104b.

FIG. 4 is a simplified flow diagram depicting a flow 400 associated with a user equipment device moving out of coverage of the enterprise environment according to one embodiment. In 402, user equipment 102 is initially within coverage of and connected to inner small cell AP 104b, and then user equipment 102 leaves the small cell network. In particular examples, user equipment 102 may leave the small cell network due to physical moving of user equipment 102 out of coverage of the small cell network or powering down of user equipment 102. In 404, first inner small cell AP starts an activity timer for user equipment 102 after not receiving a signal from user equipment 102. In a particular embodiment, the activity timer is a standard T3212 time of periodic location update (TPLU) timer as defined by various 3G standards. In still another particular embodiment, the activity timer may be defined for a predetermined time period of n*6 minutes. In 406, the predetermined time period defined by the timer expires.

In 408, inner small cell AP 104b sends a UE deregistration request to enterprise concentrator 110 including the IMSI of user equipment 102. In 410, enterprise concentrator 110 sends the UE deregistration request to small cell gateway 112 to deregister user equipment 102 with small cell gateway 112. In 412, a UE terminate API is used between enterprise concentrator 110 and small cell power controller 108 to allow enterprise concentrator 110 to provide an indication to small cell power controller 108 that user equipment 102 has left the small cell network. In a particular embodiment, the indication includes the IMSI of user equipment 102. In 414, small cell gateway 112 sends an UE deregistration acceptance message to enterprise concentrator 110 indicating that user equipment 102 has been deregistered. In 416, enterprise concentrator 110 relays the deregistration acceptance message to inner small cell AP 104b.

In 418, small cell power controller 108 determines that there are no active UEs on the small cell network. In 420, small cell power controller 108 triggers the power saving mode for inner small cell APs. In 422, small cell power controller 108 sends a power saving mode command to first inner small cell AP 104b. In 424, first inner small cell AP 104b enters the power saving mode and the flow ends.

FIG. 5 is a simplified flow diagram depicting a flow 500 associated with configuration of inner small cell access point detection of user equipment device within the enterprise environment according to one embodiment. Situations may exist in which user equipment 102 may first be detected by an inner small AP while missing detection by an active entry small cell AP. For example, a user may turn on user equipment 102 after entering the enterprise environment. Accordingly, in particular embodiments the inner small cell APs may be periodically wakened in a synchronization fashion for a short period of time (e.g., for one minutes for every 10 minutes) to enable the inner small cell APs to turn on their respective transmitters and listen for location update signals for detection of user equipment 102 in such situations.

In other particular embodiments, information obtained from the macro network may be used to configure the discontinuous reception cycle of the inner small cell APs. In particular embodiments, the information recovered from the macro network is the same information that user equipment 102 has recovered from the macro network governing how it performs its idle mode reselection. In still another particular embodiment, the information recovered from the macro network includes system information block (SIB) information including macro network reselection parameters. By passing this information to small cell power controller 108, small cell power controller 108 can use this information to optimize or improve the overall performance of the discontinuous reception period determination algorithms.

In 502, active entry small cell AP 104a decodes SIB information received from the macro network including cell reselection parameters. In 504, active entry small cell AP 104a sends a registration message to enterprise concentrator 110 including a network address of active entry small cell AP 104a and the AP type designation (active entry) of active entry small cell AP 104a. In a particular embodiment, the registration message is an HNB register message including an IP address of active entry small cell AP 104a and an extension indicating the role of active entry small cell AP 104a as an active entry small cell AP. In 506, enterprise concentrator 110 sends an HNB register message to small cell gateway 112 indicating that active entry small cell AP 104*a* has been registered in the small cell network.

In 508, the femto initiation API is used between enterprise concentrator 110 and small cell power controller 108 to allow enterprise concentrator 110 to provide the IP address of active entry small cell AP 104*a* and an indication to small cell power controller 108 that active entry small cell AP 104*a* has been initialized on the enterprise premises as an active entry small cell AP. In 510, small cell gateway 112 sends an HNB registration acknowledgement to enterprise concentrator 110. In 512, enterprise concentrator sends the HNB registration acknowledgment to active entry small cell AP 104*a* acknowledging the registration with small cell gateway 112.

In 514, small cell power controller 108 sends a macro parameter request command to active entry small cell AP 104*a* indicating a request for active entry small cell to provide the macro reselection parameters to small cell power controller 108. In 516, active entry small cell AP 104*a* provides the macro reselection parameters decoded from the SIB information to small cell power controller 108. In 518, small cell power controller 108 uses the macro reselection parameters to configure the period enabling of the transmitter of the inner small cell APs at a determined repetition period when in power saving mode. In 520, small cell power controller 108 sends periodic activation information including repetition data for enabling period transmitter activation to first inner small cell AP 104*b* and the flow ends. While in a power saving mode, if first inner small cell AP 104*b* receives a location update signal from user equipment during the period transmitter activation period, all inner APs (including first inner small cell AP 104*b*) are instructed to leave the power saving mode.

Figure 6A:
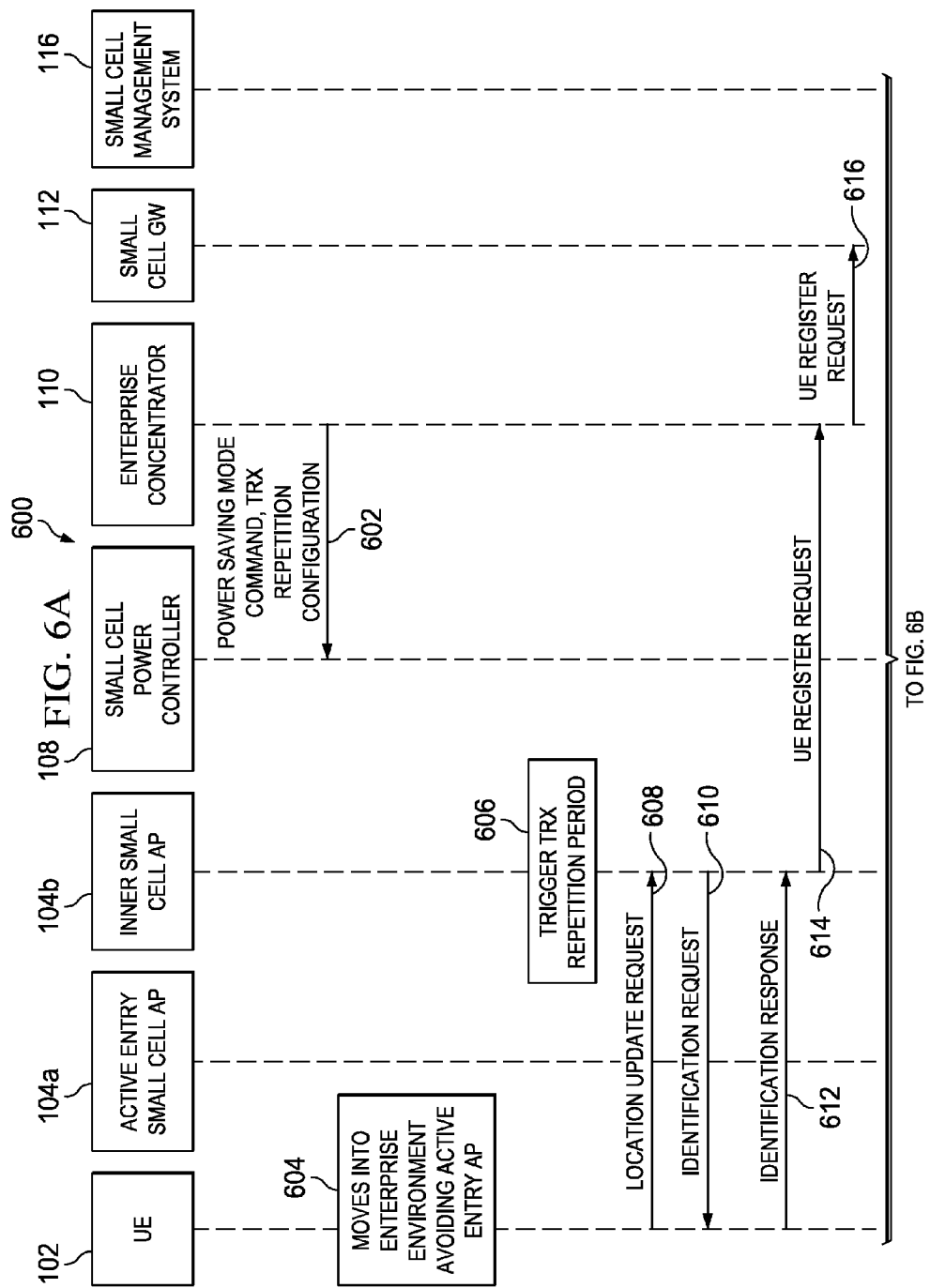
FIGS. 6A-6B are a simplified flow diagram depicting a flow associated with inner small cell access point detection of a user equipment device within the enterprise environment according to one embodiment.
Figure 6B:
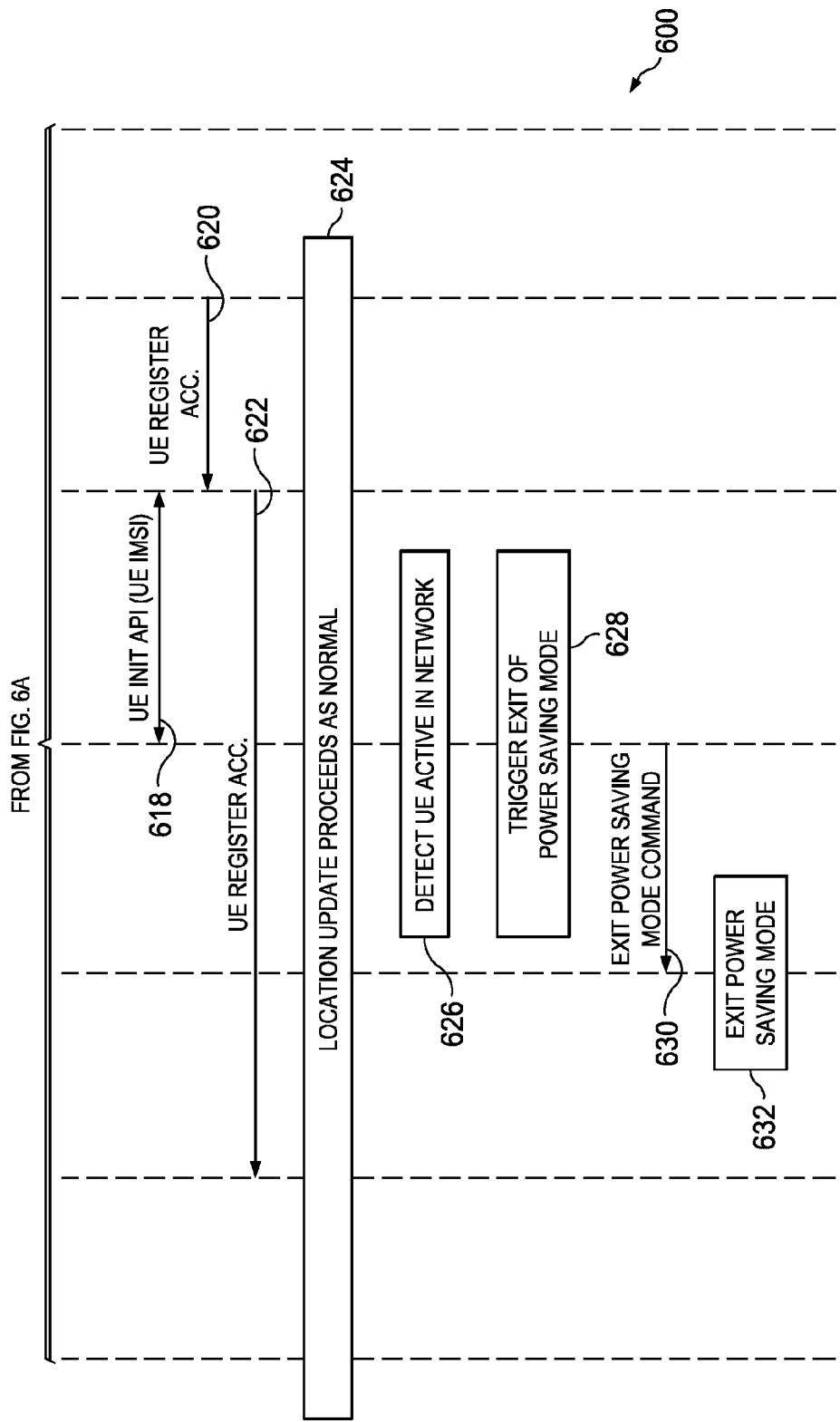

FIGS. 6A-6B are a simplified flow diagram depicting a flow 600 associated with inner small cell access point detection of a user equipment device within the enterprise environment according to one embodiment. In 602, small cell power controller 108 sends a power saving mode command including periodic transmitter repetition configuration information to inner small cell AP 104*b*. The periodic transmitter repetition configuration information includes information indicating one or more periods in which first inner small cell AP 104*b* should periodically awaken while in power saving mode. In 604, user equipment 102 moves into the enterprise environment while avoiding the active entry small cell AP 104*a*. In 606, first inner small cell AP 104*b* triggers a transmitter repetition period while in sleep mode to listen for location updates.

In 608, user equipment 102 sends a location update request to inner small cell AP 104*b*. In 610, inner small cell AP 104*b* sends an ID request to user equipment 102. In 612, user equipment 102 sends an ID response to inner small cell AP 104*b* including an identifier associated with user equipment 102. In a particular embodiment, the identifier includes the International Mobile Subscriber Identity (IMSI) of user equipment 102.

In 614, inner small cell AP 104*b* sends a UE register request including the IMSI to enterprise concentrator 110 requesting registration of user equipment 102. In 616, enterprise concentrator 110 relays the UE register request to small cell gateway 112. In 618, the UE initialization API is used between enterprise concentrator 110 and small cell power controller 108 to allow enterprise concentrator 110 to provide an indication to small cell power controller 108 that a user equipment device has been initialized on the small cell network. In a particular embodiment, enterprise concentrator 110 further provides the IMSI of user equipment 102 to small cell power controller 108. In 620, small cell gateway 112 sends an UE register acceptance message to enterprise concentrator 110 acknowledging that user equipment 102 has been registered with small cell gateway 112. In 622, enterprise concentrator 110 relays the UE register acceptance message to inner small cell AP 104*b*. In 624, standard location update procedures proceed as normal.

In 626, small cell power controller 108 determines that there is an active user equipment device, i.e. user equipment 102, within the small cell network based upon the indication received from enterprise concentrator 110. In 628, small cell power controller triggers exit of the power saving mode for the inner small cell APs. In 630, small cell power controller 108 sends an exit power saving move command to first inner small cell AP 104*b* indicating that first inner small cell AP 104*b* is to exit the power saving mode. In 632, first inner small cell AP 104*b* exits the power saving mode and the flow ends. User equipment 102 may then connect to first inner small cell AP 104*b*.

Figure 7:
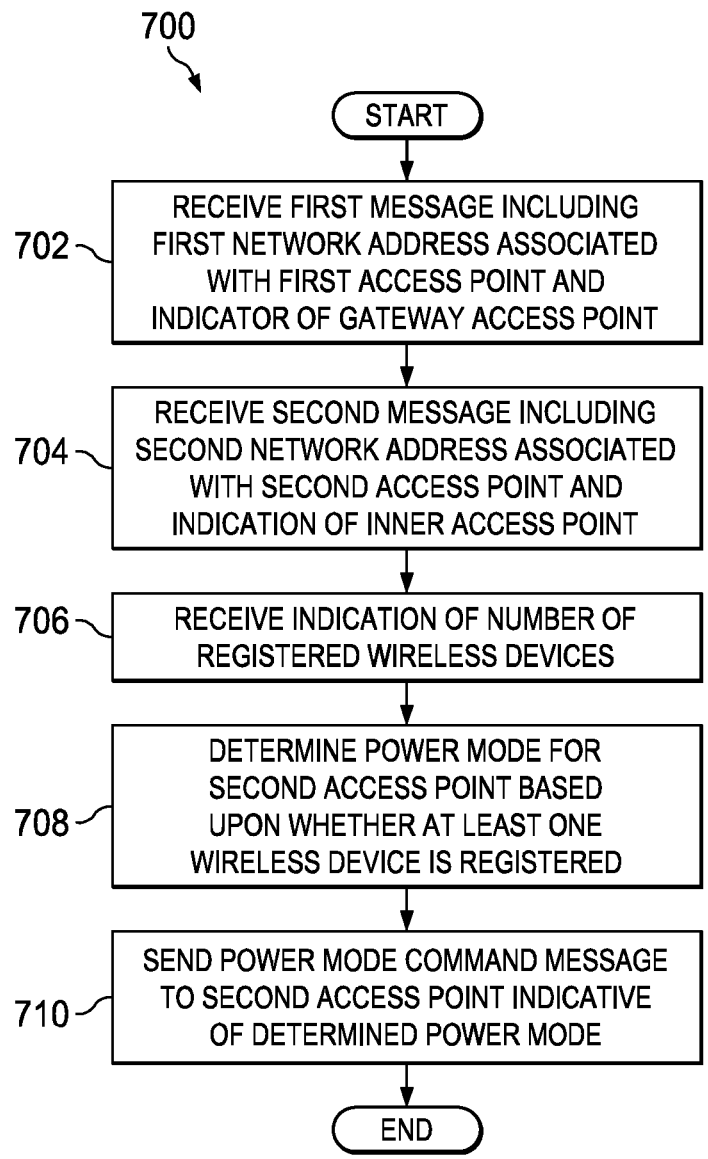
FIG. 7 is a simplified flow diagram that illustrates example operations associated with performing small cell power control in an enterprise network environment in accordance with one embodiment of the present disclosure.

Referring now to FIG. 7, FIG. 7 is a simplified flow diagram that illustrates example operations 700 associated with performing small cell power control in an enterprise network environment in accordance with one embodiment of the present disclosure. In 702, small cell power controller 108 receives a first message from enterprise concentrator 110. The first message includes a first network address associated with a first access point and an indication that the first access point is a gateway access point of a first network. In at least one embodiment, the first access point is a small cell access point and the first network is a small cell enterprise network. In a particular embodiment, the first access point is active entry small cell AP 104*a*. In a particular embodiment, the first network address is an Internet Protocol (IP) address of the first access point, and the indication is an indication that the first access point is an active entry small cell access point of the small cell network.

In 704, small cell power controller 108 receives a second message from enterprise concentrator 110. The second message includes a second network address associated with a second access point and an indication that the second access point is an inner access point of the first network. In a particular embodiment, the second access point is inner small cell AP 104*b*. In a particular embodiment, the second network address is an Internet Protocol (IP) address of the second access point, and the indication is an indication that the second access point is an inner small cell access point of the small cell network. In 706, small cell power controller 108 receives an indication from enterprise concentrator 110 of a number of wireless devices registered with at least one of the first access point and the second access point. In at least one embodiment, the indication includes an identifier associated with a particular wireless device. In a particular embodiment, the identifier is an International Mobile Subscriber Identity (IMSI) of the wireless device. In at least one embodiment, the wireless devices include user equipment devices such as user equipment 102.

In 708, small cell power controller 108 determines a power mode for the second access point based upon whether at least one wireless device is registered with the first access point or the second access point. In at least one embodiment, when there is not at least one wireless device registered with the first access point or the second access point, small cell power controller 108 determines that the power mode for the second access point is a reduced power consumption (or energy saving) mode for the second access point. In at least one embodiment, when there is at least one wireless device registered with the first access point or the second access point, small cell power controller 108 determines that the power mode for the second access point is an active power consumption mode for the second access point.

In 710, small cell power controller 108 sends a power mode command message to the second access point indicative of the determined power mode and the operations end. For example, if the determined power mode is a reduced power consumption mode, the power mode command message indicates that the second access point is to enter a reduced power consumption mode. In response, the second access point may enter the reduced power consumption mode. In a particular embodiment, entering the reduced power consumption mode may include reducing transmission power of a transmitter associated with the second access point. In another example, if the determined power mode is an active power consumption mode, the power mode command message indicates that the second access point is to enter an active power consumption mode.

Figure 8:
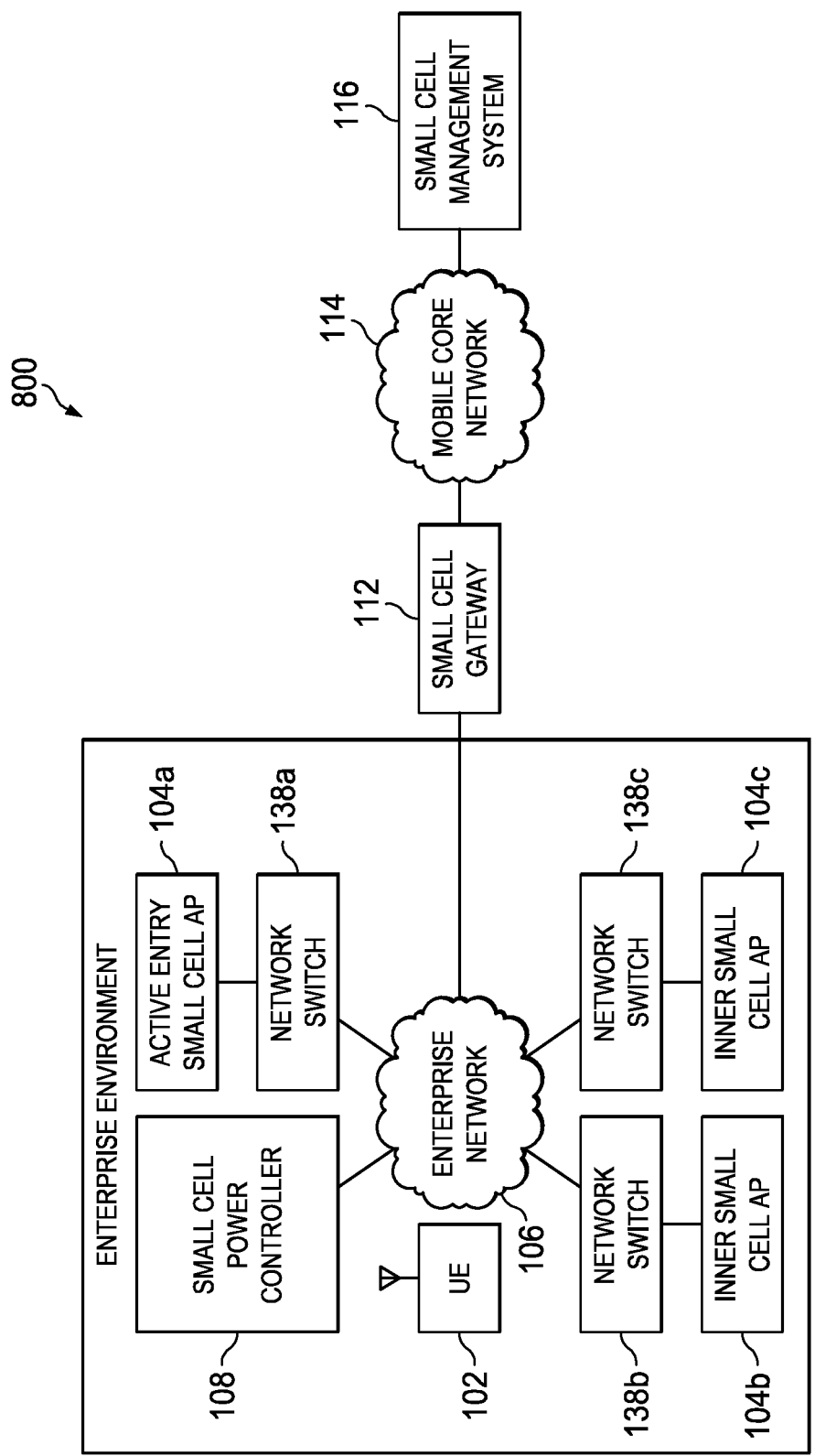
FIG. 8 is a simplified block diagram of a communication system for performing small cell power control in an enterprise network environment in accordance with another embodiment of the present disclosure.

FIG. 8 is a simplified block diagram of a communication system 800 for performing small cell power control in an enterprise network environment in accordance with another embodiment of the present disclosure. The embodiment illustrated in FIG. 8 includes user equipment 102, active entry small cell access point (AP) 104a, first inner small cell access point (AP) 104b, second inner small cell access point (AP) 104c, a first network switch 138a, a second network switch 138b, a third network switch 138c, enterprise network 106, small cell power controller 108, small cell gateway 112, mobile core network 114, and small cell management system 116. In the embodiment illustrated in FIG. 8, user equipment 102, active entry small cell AP 104a, first inner small cell AP 104b, second inner small cell AP 104c, first network switch 138a, second network switch 138b, third network switch 138c, enterprise network 106, and small cell power controller 108 are located in an enterprise environment, and small cell gateway 112, mobile core network 114, and small cell management system 116 are located within a service provider network.

Active entry small cell AP 104a is in communication with enterprise network 106 via first network switch 138a, first inner small cell AP 104b is in communication with enterprise network 106 via second network switch 138b, and second inner small cell AP 104c is in communication with enterprise network 106 via third network switch 138c. In particular embodiments, one or more of first network switch 138a, second network switch 138b, and third network switch 138c is an Ethernet switch. Small cell power controller 108 is in communication with enterprise network 106, and enterprise network 106 is in further communication with small cell gateway 112. Small cell gateway 112 is in further communication with mobile core network 114. Small cell management system 116 is in communication with mobile core network 114. User equipment 102 is configured to include a cellular radio capable of communicating with small cell access points located within a small cell environment as well as macro cells located within an service provider network.

In the embodiment of FIG. 8, small cell power controller 108 is signaled an indication of the number of active users without involvement of enterprise concentrator 110 of FIG. 1. In particular, small cell APs 104a-104c may can signal the enterprise network 106 with an indication of the number of users on the network, and enterprise network 106 may provide the indication of the number of users on the network to small cell power controller 108. In one particular embodiment, the small cell APs 104a-104c may use Link Layer Discovery Protocol (LLDP) to signal an indication of the number of attached user to an associated network switch 138a-138c in communication with the respective small cell AP 104a-104c. Small cell power controller 108 may then be operable to query the particular network switch 138a-138c for the LLDP signaled status indicating the number of attached users. In a particular embodiment, small cell power controller 108 may query the particular network switch 138a-138c using a Simple Network Management Protocol (SNMP) query of LLDP attributes.

Upon receiving an indication from one or more of network switches 138a-138c that there are no active users within the small cell network, small cell power controller 108 may be configured to trigger first inner small cell AP 104b and second inner small cell 104c to enter a power saving state. Upon receiving an indication from one or more of network switches 138a-138c that there is at least one active user within the small cell network, small cell power controller 108 may be configured to trigger first inner small cell AP 104b and second inner small cell 104c to exit the power saving state and remain reader for handover with user equipment 102. In still another particular embodiment, the determination of the number of active users may be autonomously performed by network switches 138a-138c periodically sending an indication of the number of active users attached to one or more of small cell APs 104a-104c, e.g., by using LLDP extension signaling repeating the number of UEs attached to one or more of small cell APs 138a-138c periodically.

In particular embodiments, small cell APs 104a-104c are operable to signal the number of attached UEs on the network to respective network switches 138a-138c network switches 138a-138c may signal this information to small cell power controller 108. In one embodiment, LLDP signaling is used to provide such capability. Small cell power controller 108 is then operable to signal all inner small cell APs, such as first inner small cell AP 104b and second inner small cell AP 104c to enter a energy saving state when no UEs are attached to the network. Such a signal is used by the inner small cell to switch into a power saving mode, e.g., by reducing its Common Pilot Channel (CPICH) power or disabling its transmitter completely.

In at least one embodiment, active entry small cell AP 104a is operable to signal network switch 138a with the number of UEs attached to or registered with active entry small cell AP 104a, and network switch 138a is operable to provide this information to small cell power controller 108. When small cell power controller 108 receives an indication that a new UE is attached to the network, small cell power controller 108 is operable to signal first inner small cell AP 104b and second inner small cell AP 104c that they should exit energy saving mode.

In particular embodiments, LLDP signaling is enhanced to include one or more of a power saving type-length-value (TLV) field, a power saving management IP address, an indication of a number of UE's in idle mode and an HNB power saving mode indication (active entry/inner).

In an example operation of FIG. 8 according to a particular embodiment, active entry small cell AP 104a signals first network switch 138a with an indication of a number of attached users using LLDP messages having power saving extensions. Similarly, first inner small cell AP 104b signals second network switch 138b with an indication of a number of attached users using LLDP messages having power saving extensions, and second inner small cell AP 104c signals third network switch 138c with an indication of a number of attached users using LLDP messaging having power saving extensions.

Small cell power controller 108 then queries first network switch 138a, second network switch 138b, and third network switch 138c for the number of attached users using an SNMP query for the LLDP information indicating the number of attached users. Small cell power controller 108 may then use direct signaling to send power saving signaling information to one or more of active entry small cell AP 104a, first inner small cell AP 104b, and second inner small cell AP 104c to command a particular power saving mode. For example, in response to receiving an indication that there is at least one active user connected to active entry small cell AP 104a, small cell power controller 108 may send an indication to first inner small cell AP 104b and second inner small cell AP 104c to exit a power saving mode and enter an active mode.

In regards to the internal structure associated with communication system 100, each of small cell APs 104a-104c, small cell power controller 108, enterprise concentrator 110, small cell gateway 112, and small cell management system 116 can include memory elements for storing information to be used in achieving the power control operations, as outlined herein. Additionally, each of these devices may include a processor that can execute software or an algorithm to perform the power control activities as discussed in this Specification. These devices may further keep information in any suitable memory element [random access memory (RAM), read only memory (ROM), an erasable programmable read only memory (EPROM), an electrically erasable programmable ROM (EEPROM), etc.], software, hardware, or in any other suitable component, device, element, or object where appropriate and based on particular needs. Any of the memory items discussed herein should be construed as being encompassed within the broad term 'memory element.' The information being tracked or sent to small cell APs 104a-104c, small cell power controller 108, enterprise concentrator 110, small cell gateway 112, and small cell management system 116 could be provided in any database, register, control list, cache, or storage structure: all of which can be referenced at any suitable timeframe. Any such storage options may be included within the broad term 'memory element' as used herein in this Specification. Similarly, any of the potential processing elements, modules, and machines described in this Specification should be construed as being encompassed within the broad term 'processor.' Each of the network elements and mobile nodes can also include suitable interfaces for receiving, transmitting, and/or otherwise communicating data or information in a network environment.

Note that in certain example implementations, the power control functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, memory elements [as shown in FIG. 1] can store data used for the operations described herein. This includes the memory elements being able to store software, logic, code, or processor instructions that are executed to carry out the activities described in this Specification. A processor can execute any type of instructions associated with the data to achieve the operations detailed herein in this Specification. In one example, the processors [as shown in FIG. 1] could transform an element or an article (e.g., data) from one state or thing to another state or thing. In another example, the power control activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an EPROM, an EEPROM) or an ASIC that includes digital logic, software, code, electronic instructions, or any suitable combination thereof.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and further can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the previously described activities illustrate only some of the possible signaling scenarios and patterns that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, and signaling protocols, communication system 100 may be applicable to other exchanges, routing protocols, or routed protocols. Moreover, although communication system 100 has been illustrated with reference to particular elements and operations that facilitate the communication process, these elements and operations may be replaced by any suitable architecture or process that achieves the intended functionality of communication system 100.

In a separate endeavor, communication system 100 may generally be configured or arranged to represent a 3G architecture applicable to UMTS environments in accordance with a particular embodiment. However, the 3G architecture is offered for purposes of example only and may alternatively be substituted with any suitable networking system or arrangement that provides a communicative platform for communication system 100. Moreover, the present disclosure is equally applicable to other cellular and/or wireless technology including CDMA, Wi-Fi, WiMAX, etc.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
receiving a first message including an indication that a first access point of a first network is a gateway access point of a first network;
receiving a second message including an indication that a second access point of the first network is an inner access point of the first network;
receiving an indication of a number of wireless devices registered with at least one of the first access point and the second access point;
determining a power mode for the second access point based upon whether at least one wireless device is registered with the first access point or the second access point;
sending a power mode command message to the second access point indicative of the determined power mode;
sending a request for reselection parameters associated with a second network to the first access point;
receiving the reselection parameters from the first access point; and
determining a determined repetition period for a periodic enabling of a transmitter of the second access point when in a reduced power consumption mode based upon the reselection parameters.

2. The method of claim 1, wherein the first message further includes a first network address associated with the first access point.

3. The method of claim 1, wherein the second message further includes a second network address associated with the second access point.

4. The method of claim 1, wherein the first network is a small cell network.

5. The method of claim 1, wherein the first access point is an active entry small cell access point.

6. The method of claim 1, wherein the indication includes an identifier associated with a particular wireless device.

7. The method of claim 1, when there is not at least one wireless device registered with the first access point or the second access point, determining that the power mode for the second access point is a reduced power consumption mode for the second access point.

8. The method of claim 1, when there is at least one wireless device registered with the first access point or the second access point, determining that the power mode for the second access point is an active power consumption mode for the second access point.

9. The method of claim 1, further comprising sending periodic activation information to the second access point, the periodic activation information indicating the determined repetition period.

10. The method of claim 1, wherein the second network is a macro network.

11. Logic encoded in one or more non-transitory media that includes code for execution and when executed by a processor operable to perform operations comprising:
receiving a first message including an indication that a first access point of a first network is a gateway access point of a first network;
receiving a second message including an indication that a second access point of the first network is an inner access point of the first network;
receiving an indication of a number of wireless devices registered with at least one of the first access point and the second access point;
determining a power mode for the second access point based upon whether at least one wireless device is registered with the first access point or the second access point;
sending a power mode command message to the second access point indicative of the determined power mode;
sending a request for reselection parameters associated with a second network to the first access point;
receiving the reselection parameters from the first access point; and
determining a determined repetition period for a periodic enabling of a transmitter of the second access point when in a reduced power consumption mode based upon the reselection parameters.

12. The logic of claim 11, wherein the indication includes an identifier associated with a particular wireless device.

13. The logic of claim 11, when there is not at least one wireless device registered with the first access point or the second access point, the operations further include determining that the power mode for the second access point is a reduced power consumption mode for the second access point.

14. The logic of claim 11, when there is at least one wireless device registered with the first access point or the second access point, the operations further include determining that the power mode for the second access point is an active power consumption mode for the second access point.

15. The logic of claim 11, wherein the operations further include sending periodic activation information to the second access point, the periodic activation information indicating the determined repetition period.

16. A network element, comprising:
a memory element configured to store electronic code;
a processor operable to execute instructions associated with the electronic code; and
a module coupled to the memory element and the processor, wherein the network element is configured for:
receiving a first message including an indication that a first access point of a first network is a gateway access point of a first network;
receiving a second message including an indication that a second access point of the first network is an inner access point of the first network;
receiving an indication of a number of wireless devices registered with at least one of the first access point and the second access point;
determining a power mode for the second access point based upon whether at least one wireless device is registered with the first access point or the second access point;
sending a power mode command message to the second access point indicative of the determined power mode;
sending a request for reselection parameters associated with a second network to the first access point;
receiving the reselection parameters from the first access point; and
determining a determined repetition period for a periodic enabling of a transmitter of the second access point when in a reduced power consumption mode based upon the reselection parameters.

17. The network element of claim 16, wherein the indication includes an identifier associated with a particular wireless device.

18. The network element of claim 16, when there is not at least one wireless device registered with the first access point or the second access point, the network element is further configured for determining that the power mode for the second access point is a reduced power consumption mode for the second access point.

19. The network element of claim 16, when there is at least one wireless device registered with the first access point or the second access point, the network element is further configured for determining that the power mode for the second access point is an active power consumption mode for the second access point.

20. The network element of claim 16, wherein the network element is further configured for sending periodic activation information to the second access point, the periodic activation information indicating the determined repetition period.

* * * * *